United States Patent [19]

Fukamachi et al.

[11] Patent Number: 4,901,053
[45] Date of Patent: Feb. 13, 1990

[54] ANTI-THEFT SYSTEM FOR AUTOMOTIVE VEHICLES

[75] Inventors: Masaaki Fukamachi; Mobuyuki Onitsuka, both of Miyazaki; Akira Tanaka; Kazuo Nakamura, both of Wako, all of Japan

[73] Assignees: Honda Lock Manufacturing Co., Ltd., Miyazaki; Honda Giken Kogyo Kabushiki Kaisha, Tokyo, both of Japan

[21] Appl. No.: 368,066

[22] Filed: Jun. 15, 1989

Related U.S. Application Data

[63] Continuation of Ser. No. 17,756, Feb. 24, 1987, abandoned.

[30] Foreign Application Priority Data

Feb. 28, 1986 [JP] Japan ................................ 61-043245
Feb. 28, 1986 [JP] Japan ................................ 61-043247
May 23, 1986 [JP] Japan ............................ 61-78608[U]
Feb. 14, 1987 [JP] Japan ................................ 62-31966

[51] Int. Cl.$^4$ ................................ B60R 25/00; 109 21; 109 42
[52] U.S. Cl. ................................ 340/426; 340/550; 109/21; 109/42
[58] Field of Search ................... 340/426, 550, 652; 109/21, 10, 38, 42; 200/61.08; 180/287

[56] References Cited

U.S. PATENT DOCUMENTS

| | | |
|---|---|---|
| 3,541,505 | 3/1968 | Lee . |
| 3,634,845 | 1/1972 | Colman ................ 340/550 XR |
| 3,643,756 | 2/1972 | Sareghy ................ 340/550 XR |
| 3,781,854 | 12/1973 | Kaufman et al. . |
| 3,824,539 | 7/1974 | Horvath . |
| 3,825,918 | 7/1974 | Laidlaw, Jr. et al. ............ 340/550 |
| 3,863,212 | 1/1975 | Nyc . |
| 3,909,331 | 9/1975 | Cohen ................ 340/550 XR |
| 3,969,373 | 10/1972 | Dunn et al. ................ 340/550 XR |
| 4,227,766 | 10/1980 | Finale ................ 340/550 XR |
| 4,230,918 | 10/1980 | Schroeder et al. ............ 200/61.62 |
| 4,574,268 | 3/1986 | Ohnishi . |

FOREIGN PATENT DOCUMENTS

| | | |
|---|---|---|
| 2730387 | 1/1979 | Fed. Rep. of Germany . |
| 3008964 | 9/1981 | Fed. Rep. of Germany . |
| 3333094 | 3/1985 | Fed. Rep. of Germany . |
| 3500550 | 10/1985 | Fed. Rep. of Germany . |
| 6050050 | 3/1985 | Japan . |
| 6050051 | 3/1985 | Japan . |
| 6050052 | 3/1985 | Japan . |
| 6050053 | 3/1985 | Japan . |
| 6050054 | 3/1985 | Japan . |
| 6050055 | 3/1985 | Japan . |
| 6050056 | 3/1985 | Japan . |
| 604416 | 5/1947 | United Kingdom . |
| 1125615 | 9/1965 | United Kingdom . |
| 1378607 | 12/1974 | United Kingdom . |

Primary Examiner—Donald O. Woodiel
Assistant Examiner—Brian R. Tumm
Attorney, Agent, or Firm—Frishauf, Holtz, Goodman & Woodward

[57] ABSTRACT

A signal is received from a key having predetermined information. A discriminator determines whether the received signal from the receiver represents the predetermined information. An actuator performs a predetermined anti-theft operation in response to output signals from first and second detectors indicating that at least one predetermined one of the covering members is closed and locked. The operation of the actuator is disabled in response to an output signal from the discriminator indicating that the received signal represents the predetermined information. The key includes a magnetic element forming first predetermined information, and light emitting elements for emitting infrared ray carrying second predetermined information. The actuator performs the predetermined anti-theft operation in response to an output signal from a third detector indicating that the key has been removed from a predetermined key hole, in addition to the output signals from the first and second detectors.

9 Claims, 17 Drawing Sheets

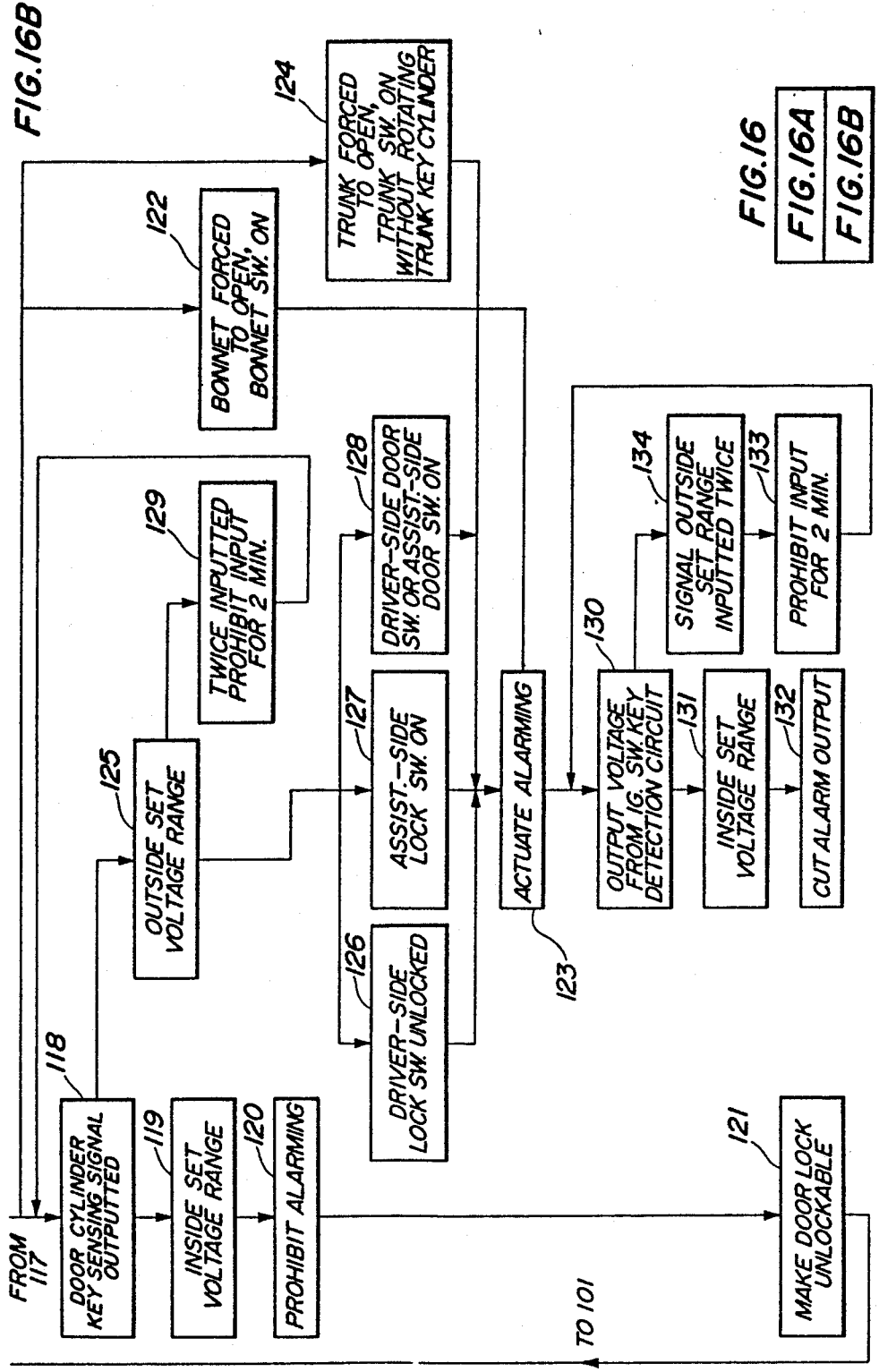

| FIG.17A | FIG.17B |
|---|---|

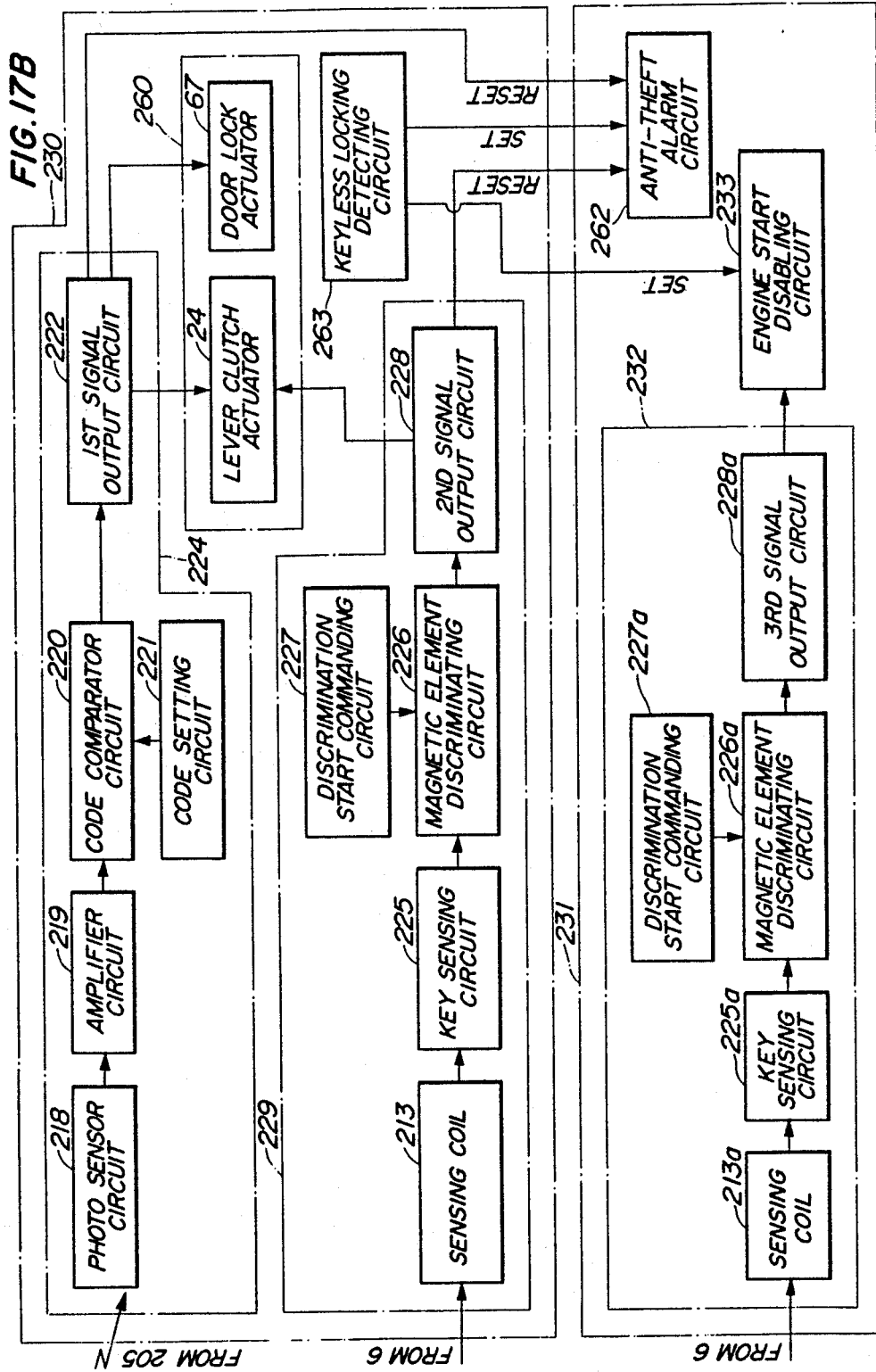

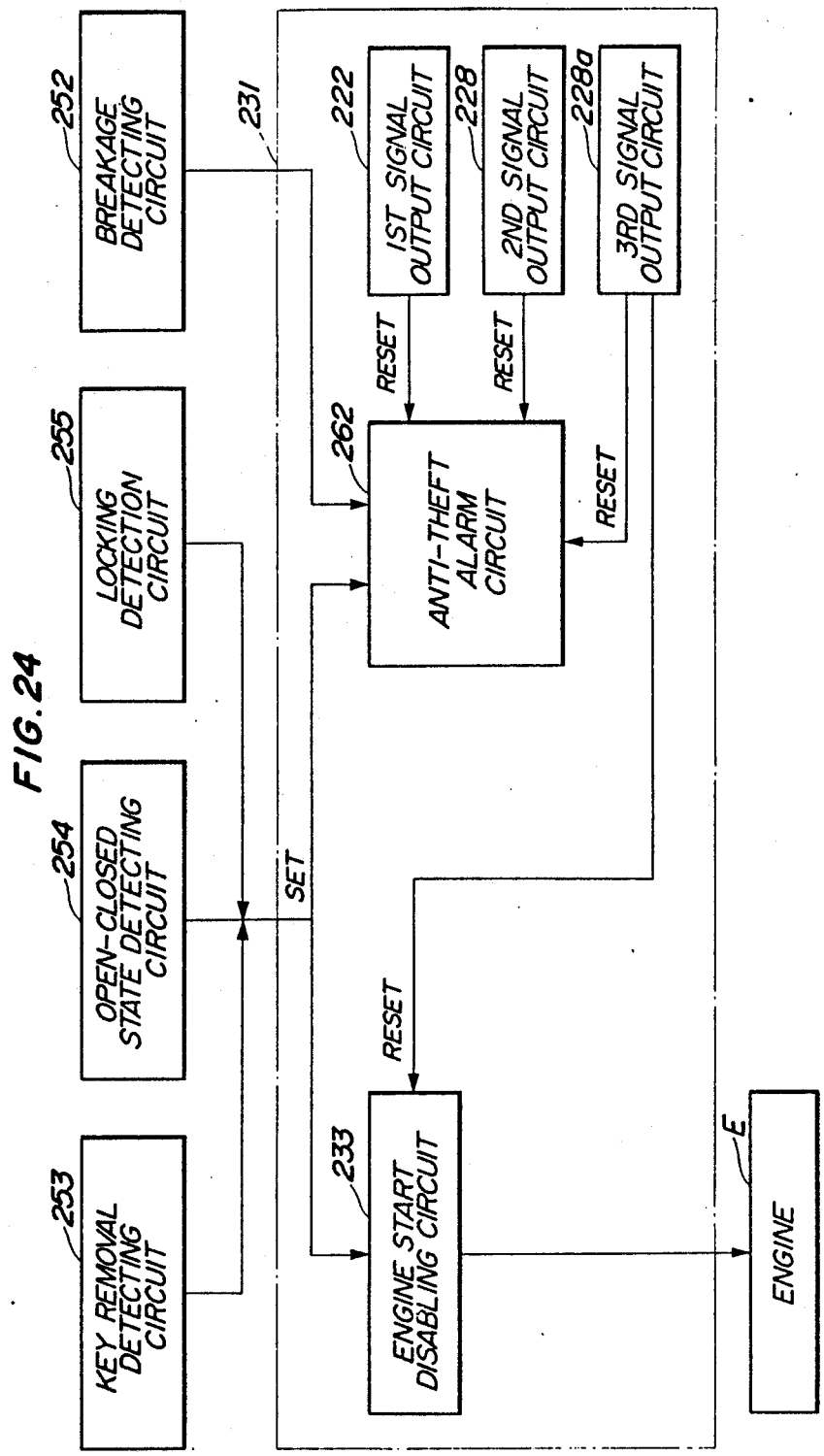

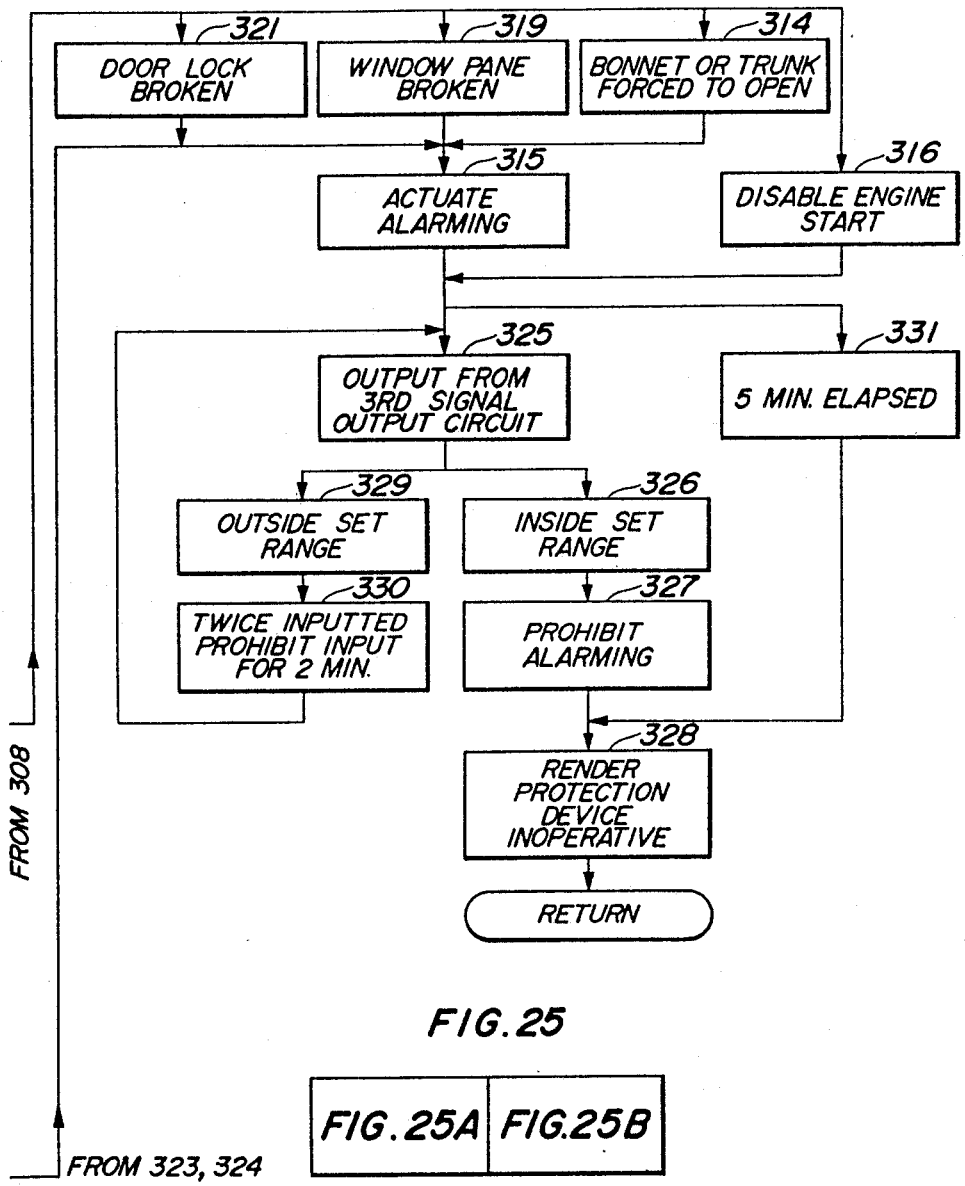
FIG. 25B
FIG. 25
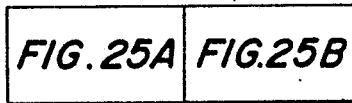

ANTI-THEFT SYSTEM FOR AUTOMOTIVE VEHICLES

This application is a continuation of application Ser. No. 078/017,756, now abandoned, filed Feb. 24, 1987.

BACKGROUND OF THE INVENTION

This invention relates to an anti-theft system for automotive vehicles.

Several anti-theft systems for automotive vehicles have been proposed e.g. by Japanese Provisional Patent Publications (Kokai) Nos. 60-50050 through 60-50056, according to which, when a driver leaves the vehicle, it is detected whether or not locking of all covering parts which are openable and closable, such as doors, a trunk, and a bonnet (hereinafter merely called "coverings") has been properly effected, and upon the lapse of a certain time period after detection of such locking an alarm permission mode is set up, whereby if a door lock is broken, or any one of the coverings is opened without effecting a predetermined resetting operation for cancelling the alarm permission mode, the alarm is given immediately. Generally, in such systems, the alarm permission mode is cancelled either when it is detected that a door lock is rotated from a locking position to an unlocking position by operation of a proper key, or when it is detected that a looking and unlocking lever of a door lock mechanism is swung in the unlocking direction. Therefore, these conventional systems cannot protect the automotive vehicles from such illegal burglarious conduct such as operation of an indoor lock knob after breakage of a door glass, or forcibly swinging the locking and unlocking lever of the door lock mechanism by means of a wire, etc. which is inserted through a gap between the windowpane of a door and the frame of the door.

SUMMARY OF THE INVENTION

It is an object of the invention to provide an anti-theft system for automotive vehicles which makes it impossible to illegally unlock a lock of an automotive vehicle by breaking a door windowpane or by the use of a wire, etc.

It is a further object of the invention to provide an anti-theft system for automotive vehicles, which makes it impossible to illegally unlock a door of an automotive vehicle by the use of an improper key.

According to the invention, an anti-theft system for an automotive vehicle is provided which comprises: a key having predetermined information; receiver means provided in the automotive vehicle for receiving a signal from the key; discriminating means for receiving an output signal from the receiver means and discriminating whether or not the output signal represents the predetermined information; first detecting means for detecting whether a plurality of covering members of the automotive vehicle are closed or open; second detecting means for detecting whether the covering members are locked or unlocked; actuator means responsive to output signals from the first and second detecting means indicating that at least one predetermined one of the covering members is closed and locked, for performing a predetermined anti-theft operation; and disabling means responsive to an output signal from the discriminating means indicating that the output signal from the receiver means represents the predetermined information, for disabling the operation of the actuator means.

Preferably, the anti-theft system includes a third detecting means for detecting whether the key has been removed from a predetermined key hole, the actuator means being responsive to output signals from the first, second, and third detecting means indicating that the second key has been removed from the predetermined key hole, and the at least one predetermined covering member is closed and locked, for performing the predetermined anti-theft operation.

The actuator means may comprise alarming means responsive to an output signal from the first detecting means indicating that predetermined one of the covering members has been opened in a manner other than a predetermined opening manner, for performing a predetermined alarming operation.

Alternatively, the actuator means may comprise means for disabling starting of an engine installed in the automotive vehicle.

The anti-theft system may include breakage detecting means for detecting breakage of a predetermined windowpane, and the actuator means may comprise means responsive to an output signal from the breakage detecting means indicating that the predetermined windowpane has been broken, for performing a predetermined alarming operation.

Preferably, the automotive vehicle has a lock mechanism for locking and unlocking respective one of the covering members, the lock mechanism including lever means being rotatable for locking and unlocking the respective one of the covering members, the actuator means comprising means for rendering the operation of the lever means ineffective and thereby prohibiting unlocking of the respective one of the covering members.

The means for rendering the operation of the lever means ineffective may comprise an actuator, and a free rotation mechanism driven by the actuator for rendering the lever means freely rotatable whereby unlocking of the respective one of the covering members is not realized.

More preferably, the automotive vehicle includes a cylinder lock provided in at least one of the covering members and being operatable from outside of the automotive vehicle and a lock knob provided in the at least one covering member and being operatable from inside of the automotive vehicle, the lever means of the lock mechanism comprising a first locking lever being rotatable in response to operation of at least one of the cylinder lock and the lock knob, and a second locking lever being rotatable to cause the lock mechanism to selectively assume a position in which the at least one covering member is locked or a position in which the at least one covering member is unlocked, the means for rendering the operation of the lever means ineffective comprising clutch means provided between the first locking lever and the second locking lever for interlocking the first and second locking levers with each other such that the first and second locking levers can rotate together and for disengaging the first and second locking levers from each other.

Further preferably, the key having the predetermined information includes: a magnetic element arranged at least in part thereof and forming predetermined information; and/or infrared ray emitting means arranged at least in part thereof for emitting infrared ray carrying another predetermined information.

The above and other objects, features and advantages of the invention will be more apparent from the ensuing detailed description taken in conjunction with the accompanying drawings.

BRIEF DESCRIPTION OF THE DRAWINGS

FIG. 24 is a block diagram illustrating a whole arrangement of the second embodiment.

DETAILED DESCRIPTION

The invention will now be described in detail with reference to the drawings showing preferred embodiments thereof.

Figure 1:
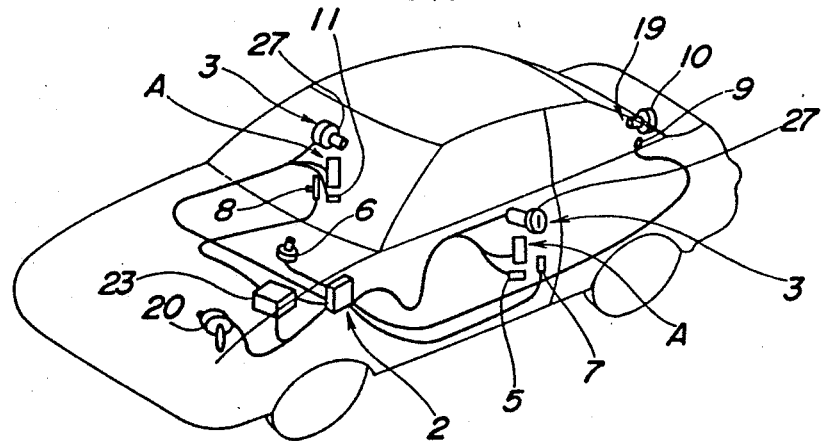
FIG. 1 is a schematic view of an automotive vehicle, showing the locations of various switches and door cylinder locks.
Figure 2:
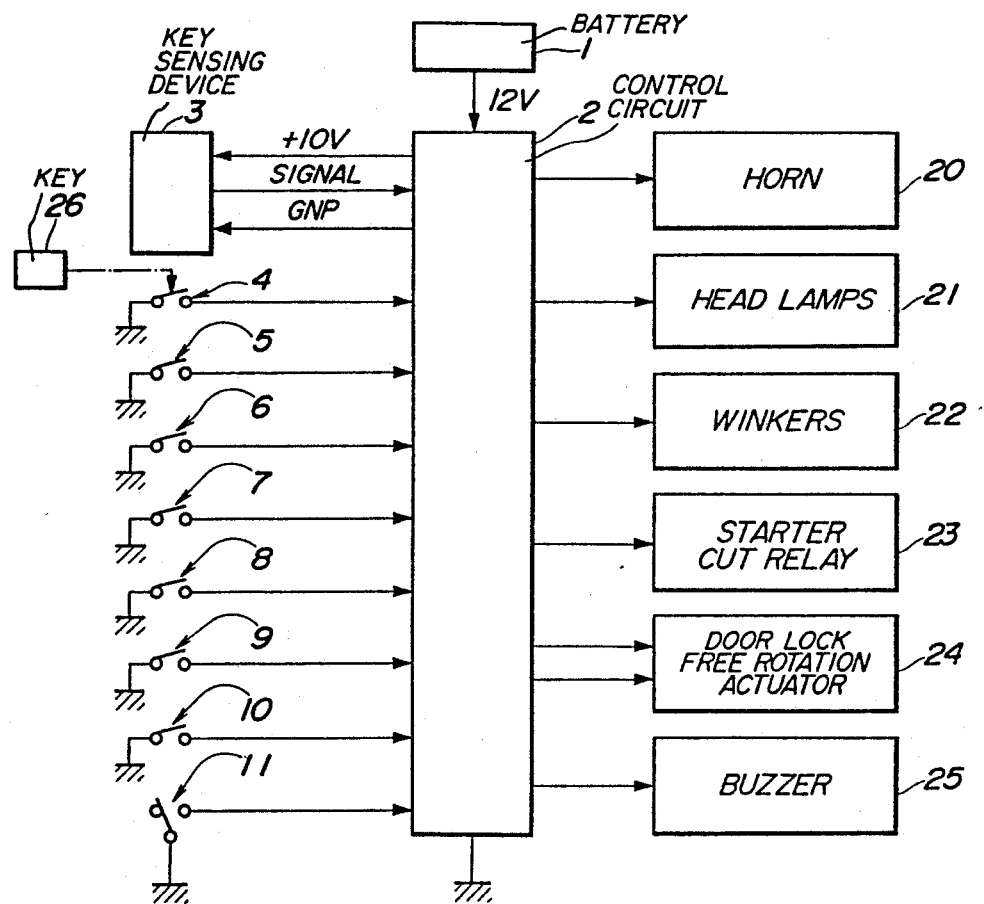
FIG. 2 is a block diagram showing the construction of an anti-theft system for automotive vehicles of the invention.

FIG. 1 shows the locations of various switches and door cylinder locks in an automotive vehicle to which the anti-theft system of the invention is applied, and FIG. 2 shows in the form of a block diagram an anti-theft system for automotive vehicles as a first embodiment of the invention.

This anti-theft system is mainly composed of a control circuit 2 (including input/output circuits, a power supply circuit, a central processing unit, memory means. etc) which is powered by a battery 1, and two key sensing devices 3, 3 connected to the control circuit 2.

The control circuit 2 has input terminals connected respectively to the two key sensing devices 3, 3 one of which is provided in the driver-side door and the other in the assistant-side door, a look pin switch 4, an assistant-side lock knob switch 5, a bonnet switch 6, an assistant-side door switch 7, a driver-side door switch 8, a trunk switch 9, a trunk lock switch 10 (for sensing rotation of a key cylinder 19 of the trunk), and a driver-side lock knob switch 11. The on/off states of these switches are monitored by the control circuit 2.

The lock pin switch 4 is turned off when a key 26 is pulled out of a key switch or ignition switch, not shown, for steering lock mechanism to allow a lock pin to be projected into the key hole (DOWN) while a steering lock mechanism, not shown, is in a steering locking position, and the lock pin switch 4 is turned on when the key 4a is inserted and turned to force the lock pin, not shown, to be raised out of the key hole (UP).

The assistant-Side lock knob switch 5 and the driver-side lock knob switch 11 are turned off, respectively, when the assistant-side door and the driver-side door of the vehicle are locked by means of respective lock knobs, not shown, and they are turned on when the doors are unlocked.

The bonnet switch 6 indicates the open and closed states of the bonnet of the vehicle such that the bonnet switch 6 is turned on when he bonnet is open and turned off when the bonnet is closed.

The assistant-side and driver-side door switches 7, 8 are turned off when the assistant-side door and the driver-side door are closed, respectively, and the switches 7, 8 are turned on when the assistant-side door and the driver-side door are opened, respectively.

The trunk switch 9 indicates the open and closed states of the trunk of the vehicle such that the trunk switch 9 is turned off when the trunk is closed and turned on when the trunk is opened.

The trunk lock switch 10 is turned on when the key cylinder 19 of the trunk is turned to an unlocking angle position, and the former is turned off when the latter assumes a position other than the unlocking angle position.

Connected to output terminals of the control circuit 2 are a horn 20, headlights 21, winkers 22, a starter cut relay 23, an actuator 24 for allowing free rotation of the door lock rotor, and an alarming buzzer 25.

The key sensing devices 3 are each adapted to sense a code signal from a key 26 when the key 26 is inserted in the cylinder lock 27. The key 26 contains a magnetic element forming a predetermined code, as described later.

Figure 3:
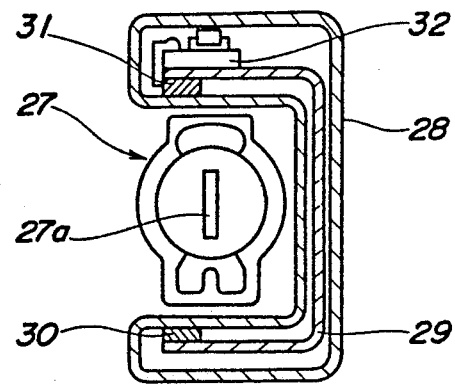
FIG. 3 is a cross-sectional view of a key sensing portion of the anti-theft system according to a first embodiment of the invention.

In this embodiment, each key sensing device 3 has a case 28 of a U-shaped cross section arranged outside a door cylinder lock 27 with a key hole 27a, as shown in FIG. 3. A yoke 29 of a U-shaped cross section is housed within the case 28. A magnet 30 is inserted between an inner side face of one end of the yoke 29 and an inner wall face of the case 28, and a Hall element 31 as a magnetic sensing element is inserted between an inner side face of the other end of the yoke 29 and an inner wall face of the case 28. Also, an amplifier circuit 32 having the Hall element 31 as one of its components is provided on an outer side face of the other end of the the yoke 29.

Figure 4:
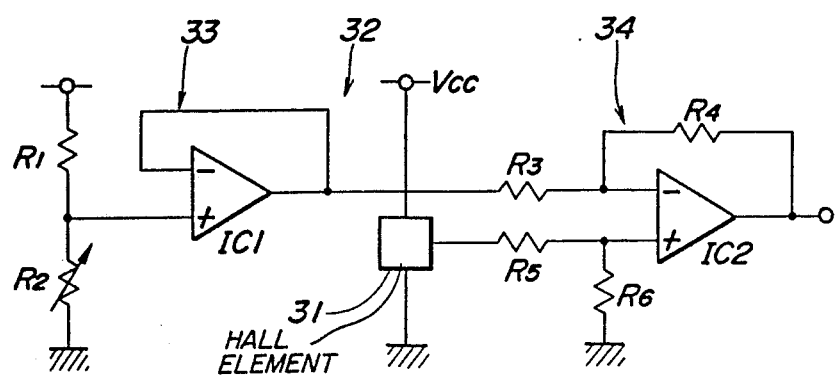
FIG. 4 is a circuit diagram showing an amplifier circuit appearing in FIG. 3.

As shown in FIG. 4, this amplifier circuit 32 is composed of a non-inverting amplifier (a voltage follower circuit) 33, a differential amplifier 34, and the Hall element 31. The non-inverting amplifier 33 comprises a first operational amplifier IC1, and resistances R1 and R2. A reference voltage at the junction between the resistances R1 and R2 is inputted to a non-inverting input terminal of the operational amplifier IC1.

The differential amplifier 34 comprises a second operational amplifier IC2 and resistances R3 through R6. The reference voltage from the operational amplifier IC1 and an output voltage from the Hall element 31 are inputted to he inverting terminal and non-inverting terminal of the operational amplifier IC2, respectively, whereby the difference between the two voltages is amplified. The amplification factor of this circuit 34 is determined by the resistance values of the resistances R3, R4, R5, and R6.

Figure 5:
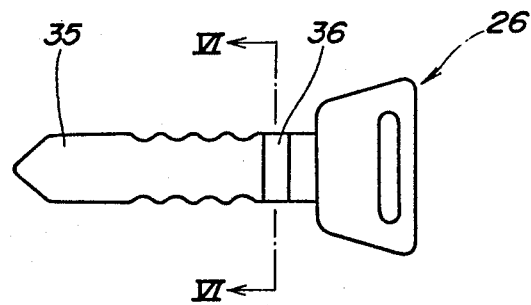
FIG. 5 is a side view of the key.
Figure 6:
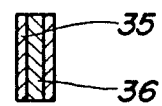
FIG. 6 is a cross-sectional view taken on line VI—VI in FIG. 5.
Figure 7:
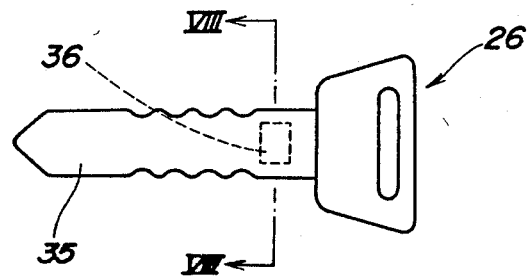
FIG. 7 is a side view of another example of the key.
Figure 8:
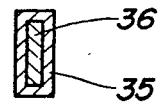
FIG. 8 is a cross-sectional view taken on line VIII—VIII in FIG. 7.

As shown in FIGS. 5 and 6, the key 26 has a magnetic element 36 composed of two magnetic element halves forming a predetermined code attached to opposite side surfaces of a non-magnetic key body 35. Alternatively, as shown in FIGS. 7 and 8, the key 26 may have a magnetic element 36 buried within the key body 35.

Incidentally, although the number of the magnetic element 36 used is not limited to one as in FIGS. 5 and 6, but may be two or more. The number of the magnetic sensing element (Hall element 31) provided in the key sensing device 3 is not limited to one, either.

As regards the number of codes of the key 26, it is possible to obtain about 15 codes different in permeability by making the kind, size, and/or thickness of the magnetic element differ between magnetic elements manufactured.

In the amplifier circuit in FIG. 4, provided that the supply voltage Vcc is 10 volts (which is supplied from the control circuit 2), the maximum output voltage of the second operational amplifier IC2 is 8.5 volts, the output voltage of the Hall element 31 with the key 26 removed from the door cylinder lock 27 is 1 volt, the reference voltage from the first operational amplifier IC1 is 1 volt, and the amplification factor of the second operational amplifier IC2 is 50, then the output voltage from the second operational amplifier IC2 with the key 26 removed from the door cylinder lock 27 becomes 0 volt. On the other hand, if the output voltage of the Hall element 31 with the key 26 inserted in the door cylinder lock 27 is 1.1 volts, then the output voltage of the second operational amplifier IC2 is as follows:

$$(1.1-1) \times 50 = 5(v)$$

The output voltage of the Hall element 31 is determined by the permeability of the magnetic element 36 provided in the key 26, so that if it is desired that the output voltage of the second operational amplifier IC2 assumes 15 different values within a range from 0 to 8.5 volts, 15 different kinds of magnetic elements 36 should be provided which are different in the permeability such that the output voltage of the Hall element 31 assumes different values as shown in the following table.

| No. | Output V. of Hall Element (Central Value) | Output V. of Hall Element | Output V. of IC2 |
| --- | --- | --- | --- |
| 1 | 1.024 | 1.020–1.028 | 1.0–1.4 |
| 2 | 1.034 | 1.030–1.038 | 1.5–1.9 |
| 3 | 1.044 | 1.040–1.048 | 2.0–2.4 |
| 4 | 1.054 | 1.050–1.058 | 2.5–2.9 |
| 5 | 1.064 | 1.060–1.068 | 3.0–3.4 |
| 6 | 1.074 | 1.070–1.078 | 3.5–3.9 |
| 7 | 1.084 | 1.080–1.088 | 4.0–4.4 |
| 8 | 1.094 | 1.090–1.098 | 4.5–4.9 |
| 9 | 1.104 | 1.100–1.108 | 5.0–5.4 |
| 10 | 1.114 | 1.110–1.118 | 5.5–5.9 |
| 11 | 1.124 | 1.120–1.128 | 6.0–6.4 |
| 12 | 1.134 | 1.130–1.138 | 6.5–6.9 |
| 13 | 1.144 | 1.140–1.148 | 7.0–7.4 |
| 14 | 1.154 | 1.150–1.158 | 7.5–7.9 |
| 15 | 1.164 | 1.160–1.168 | 8.0–8.4 |

An automatic door lock free rotation mechanism A in the automatic door lock mechanism is shown in FIGS. 9 through 15. The automatic door lock free rotation mechanism A has a housing 43 formed by a back plate 41 and a cover 42.

The housing 43 comprises an actuator container 44, a gear container 45, and a rack container 46. A fulcrum shaft 47 is rotatably mounted in a bottom portion of the housing 43.

A motor 48 as the lever clutch actuator 24 is rigidly mounted in the actuator container 44. A cap 49 is fitted on the top of the cover 42 of the housing 43. An electric cord 50 is connected to terminals 48a, 48b of the motor 48 and extends to the outside via a guide hole 51 formed in the cap 49. A drive gear 53 is secured on an output shaft 52 of the motor 48.

Figures 11, 12:
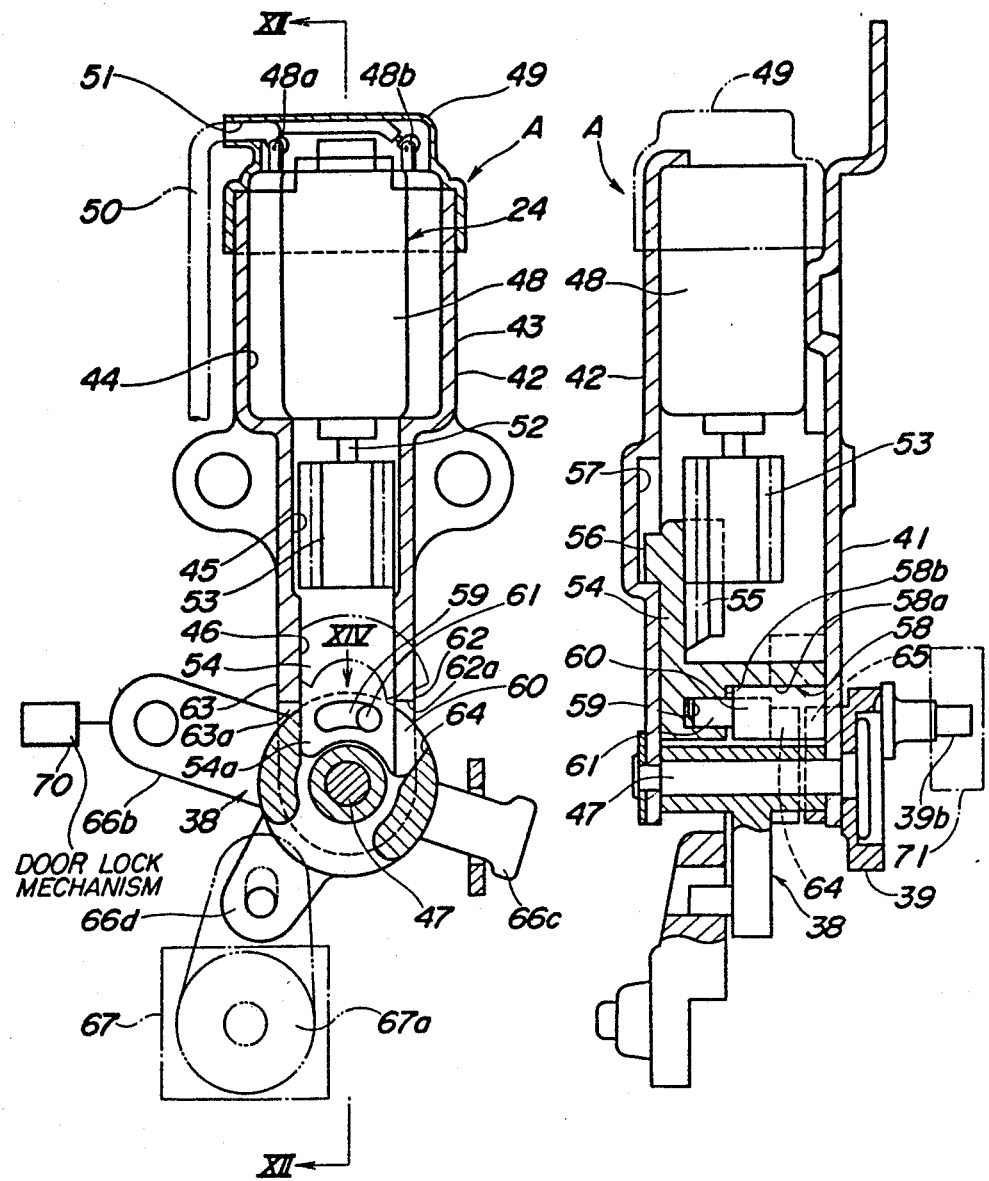
FIG. 11 is a longitudinal cross-sectional view of same wherein part of the door lock free rotation mechanism is omitted.
FIG. 12 is a cross-sectional view taken on line XII—XII in FIG. 9.
Figure 13:
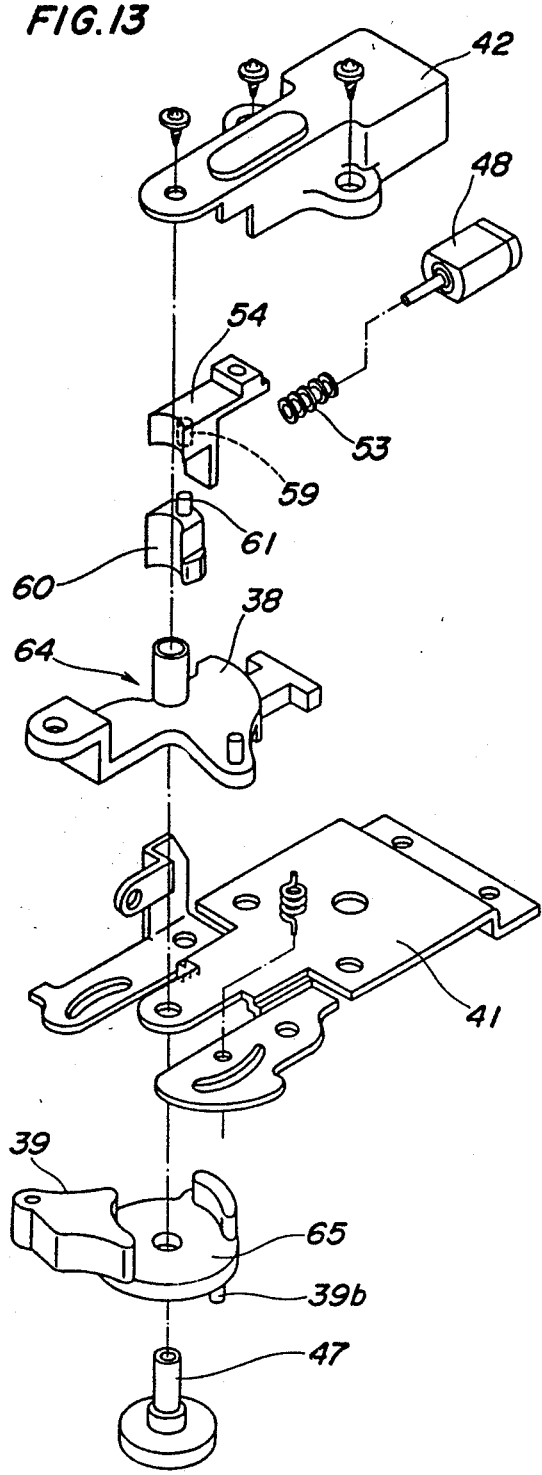
FIG. 13 is an exploded perspective view of essential parts of the free rotation mechanism.
Figure 14:
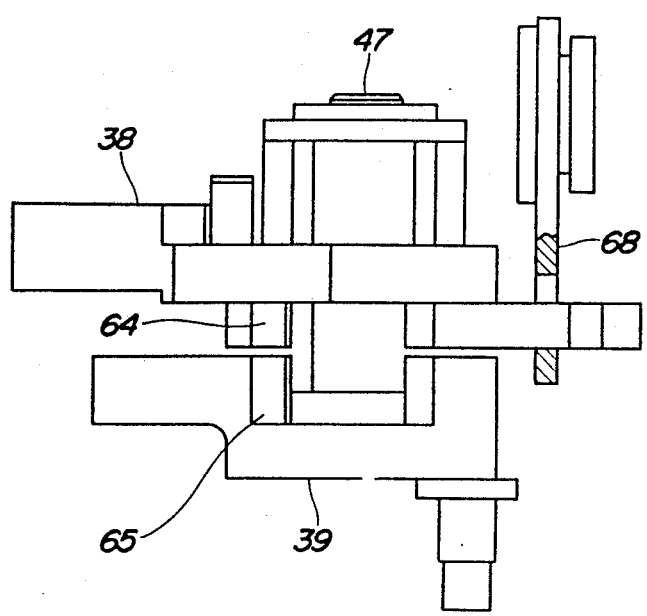
FIG. 14 is a view taken from the arrow XIV—XIV in FIG. 11.

A guide rack 54 is mounted in the rack container 46 for vertical movement therein, as viewed in FIG. 11. A guide stopper 56 is formed integrally with the guide rack 54 at an opposite side surface thereof to a side surface on which gear teeth 55 are formed. The guide stopper 56 is slidably inserted into a guide groove 57 formed in the cover 42. The guide rack 54 has an arcuate lower edge 54a defining a cam space 58 having an arcuate ceiling surface 58a. An arcuate pin inserting groove 59 is formed in a front vertical wall 58b of the cam space 58.

Figure 15:
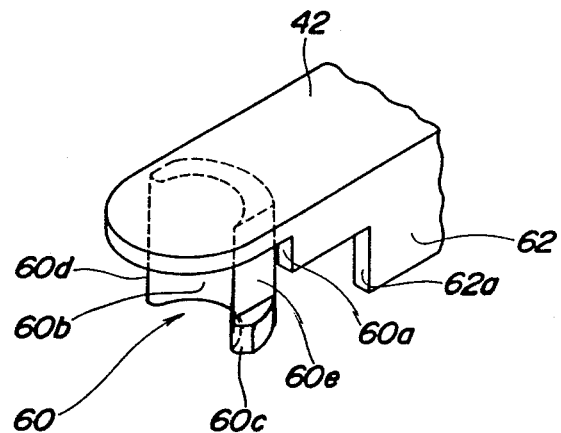
FIG. 15 is a fragmentary perspective view of a cover and a lock cam of the door lock free rotation mechanism.

A lock cam 60 is mounted within the cam space 58, which has a top face 60a and a bottom face 60b both presenting arcuate surfaces, whereas the lock cam 60 has opposite side surfaces 60c, 60d tapered. A notch 60e is formed in the side surface 60c (FIG. 15). A pin 61 is planted on a front face of the lock cam 60. The lock cam 60 is rotatably received in the cam space 58 with the pin 61 inserted in the pin inserting groove 59 and the top face 60a in slidable contact with the upper ceiling surface 58a of the cam space 58.

Cut-away portions 62a, 63a are formed in bottom portions of opposite side walls 62, 63 of the cover 42 of the housing 43.

A first locking lever 38 and a second locking lever 39 are rotatably mounted a respective intermediate portions thereof on the fulcrum shaft 47 in the housing 43 in an overlapping and concentric fashion. Tapered recesses 64, 65 in which the lock cam 60 is inserted are formed in side faces of the respective intermediate portions of the first and second locking levers 38, 39. The first locking lever 38 comprises first, second, and third lever portions 66b, 66c, and 66d.

The first lever portion 66b is coupled with a lock knob 70, the second lever portion 66c with the door cylinder lock 27, and the third lever portion 66d with a door lock actuator 67 formed of an electric motor via a lever 67a.

The second locking lever 39 is coupled via an eccentric pin 39b with an intermediate member 71 of a lock mechanism 70.

A door lock mechanism is generally constructed as follows:

A rotary latch for door locking provided in the door is arranged for engagement with a striker provided on a vehicle door brace on the vehicle body side. The rotary latch is hooked by a pole so as to prevent reverse rotation of the rotary latch whereby the door is maintained unopenable. On the other hand, an open lever is pivotally interconnected between a door handle (outer handle or inner handle) and the intermediate member 71 in order to remove the pole, from the rotary latch. The intermediate member 71 is interconnected between the open lever and the second locking lever 39 for disengaging the pole from the rotary latch in response to pivotal movement of the open lever.

Locking and unlocking of the door lock is realized by means of the first and second locking levers 38, 39 connected to the door cylinder lock 27 or the lock knob 70. Rotation of the locking lever causes displacement of the intermediate member 71 connecting the open lever with the second locking lever 39, such that if the locking levers 38, 39 are in the locking position the intermediate member is displaced out of engagement with the pole so that the pole does not swing even if the open lever is pulled whereby the rotary latch is not disengaged from the striker, and if, on the other hand, the locking levers 38, 39 are in the unlocking position the intermediate member is displaced into engagement with the pole so that by operating the door handle it is possible to swing the pole via the open lever whereby the rotary latch is disengaged from the striker.

The door lock mechanism of the above construction is operated as follows:

(1) Operation of the Door Lock

When a control signal from the control circuit 2 of the anti-theft system is inputted to the motor 48, the motor 48 rotates in such a direction that the drive gear 53 is rotated to cause descending of the guide rack 54 meshing with the drive gear 53 via the rack gear teeth 55.

As a result, the lock cam 60 coupled with the guide rack 54 is brought into engagement with the cam inserting recesses 64, 65 of the first and second locking levers 38, 39, whereby the first locking lever 38 and the second locking lever 39 are interlocked with each other via the look cam 60 for rotation together.

Consequently, by operating either the door cylinder lock 27 or the lock knob 70 connected to the first locking lever 38, or by actuating the door lock actuator 67, the intermediate member 71 connected to the second locking lever 39 is moved into the unlocking position.

Then, if the outer handle or inner handle of the door is operated, the pole, not shown, is swung via the opening lever, not shown, and the intermediate member 71 so that the rotary latch, not shown, is rotated to open the door.

(2) Door Look Free Rotation State

When the first and second locking levers 38, 39 are interlocked with each other by the lock cam 60 engaged in the cam inserting recesses 64, 65, if a control signal from the control circuit 2 of FIG. 2 is inputted to the motor 48, the motor 48 rotates in a direction reverse to the aforementioned direction, whereby the guide rack 54 ascends via the drive gear 53 and the rack gear teeth 55.

As a result, the lock cam 60 leaves the cam inserting recesses 64, 65, whereby the interlocking of the first looking lever 38 with the second locking lever 39 via the lock cam 60 is released.

With the lock cam 60 in this position, even if the door cylinder lock 27 or the lock knob 70 is operated, only the first locking lever 38 is rotated but the second locking lever 39 does not rotate, wherefore the intermediate member 71 coupled wi&h the second locking lever 39 cannot move into the unlocking position. Therefore, even if the outer handle or the inner handle is operated to rotate the open lever, the pole, which is then disengaged from the intermediate member 71, remains unmoved so that the door lock is maintained in the lock position.

Figure 16A:
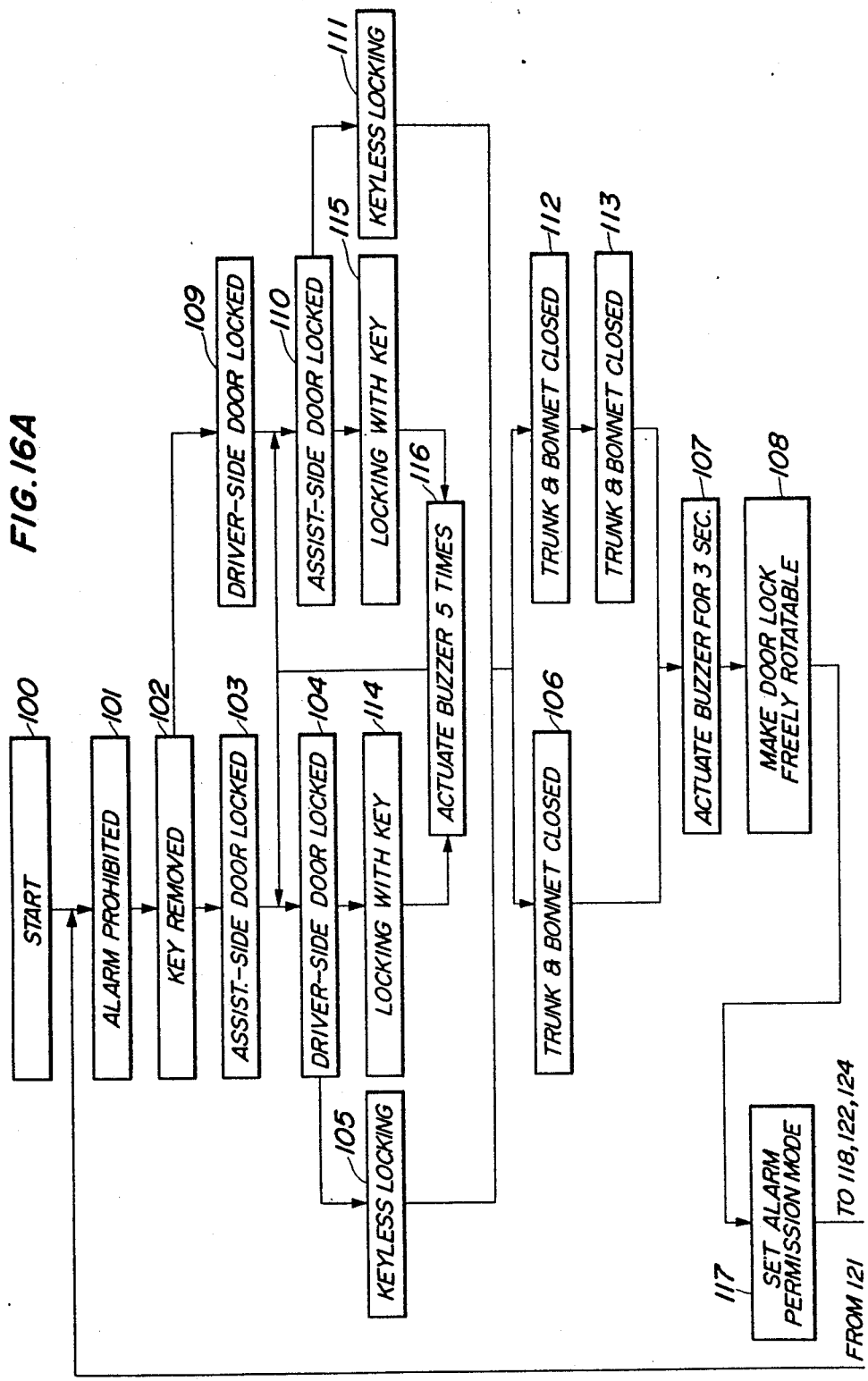
FIG. 16–16B are a flowchart showing a manner of operating the anti-theft system.

Next, the operation of the anti-theft system for automotive vehicles according to the invention will be described with reference to the flowchart of FIG. 16.

(1) Transition from alarm prohibition mode to alarm permission mode:

The alarm permission mode is established only when the driver-side door and the assistant-side door are both locked by means of the lock knobs (i.e. keyless lock).

To be specific, supposing that the anti-theft system is in the alarm prohibition mode (step 101) at the time of starting (step 100), and then the key 26 is removed from the key switch of the steering lock mechanism (step 102), then the lock pin of the steering lock mechanism juts out, which is detected by the lock pin switch 4 whereby the latter 4 is turned off.

There are two conditions for the alarm permission mode to be established. The first condition is as follows: The assistant-side door is locked by means of the lock knob (step 103), the driver-side door is locked without using the key 26, i.e. in a keyless lock manner (by depressing the lock knob with the door open, and then shutting the door) (steps 104, 105), and the trunk and the bonnet are in closed position (step 106). If this condition is fulfilled, various switches assume the following on-off states: The lock pin switch 4, the assistant-side lock knob switch 5, and the assistant-side door switch 7 continue to be off, the driver-side door lock knob switch 11 and the driver-side door switch 8 are turned off, and the bonnet switch 6, the trunk switch 9, and the trunk lock switch 10 all continue to be off. As a result, the control circuit 2 delivers a command signal to the buzzer 25 to operate same for a predetermined time period (e.g. 3 seconds) to thereby inform that the alarm permission mode has been established (step 107).

At the same time, the control circuit 2 delivers another command signal to the lever clutch actuator 24 of the door lock mechanism, whereby the first locking lever 38 of the door lock mechanism is disengaged from the second locking lever 39 (thus the door lock mechanism is set to the free rotation allowing position). Then neither operation of the door cylinder lock 27 nor operation of the lock knob can cause unlocking of the door lock mechanism (step 108).

The second condition for the alarm permission mode to be established is as follows: The key 26 is removed from the key switch of the steering lock mechanism (step 102), the driver-side door is locked by means of the lock knob (step 109), the assistant-side door is locked in the keyless lock manner (steps 110, 111), and the trunk and the bonnet are closed (step 113) or become closed (step 113) if they are open (step 112). If this second condition is fulfilled, various switches assume the following on-off states: The lock pin switch 4, the driver-side lock knob switch 11, the driver-side door switch 8, the bonnet switch G, the trunk switch 9, and the trunk lock switch 10 all continue to be off, and the assistant-side lock knob switch 5 and the assistant-side door switch 7 are turned off. As a result, the control circuit 2 delivers a command signal to the buzzer 25 to cause same to operate for a predetermined time period (e.g. 3 seconds), to thereby inform that the alarm permission mode has been established (step 107), and then the step 108 is executed.

Since the condition for establishment of the alarm permission mode includes the keyless locking as noted above, it is possible to prevent the driver from forgetting to set up the alarm permission mode.

(2) Prevention of driver's forgetting to set up the alarm permission mode:

If the key 26 is removed from the key switch (step 102, and the driver-side door or the assistant-side door is locked with the key (steps 114, 115), then it is detected that the door has been locked without keyless locking (step 105 or 111), whereupon the buzzer 25 repeatedly operates five times (step 116) to thereby inform that setting of the alarm permission mode has been neglected.

On this occasion, the various switches assume the following on-off states: The lock pin switch 4, the assistant-side door switch 7, and the assistant-side lock knob switch 5 continue to be off, the driver-side door switch 8 and the driver-side lock knob switch 11 are turned off, and the bonnet switch 6, the trunk switch 9, and the trunk lock switch 1 continue to be on or off.

However, if on his occasion the bonnet switch 6, the trunk switch 9, and the trunk lock switch 10 are all off, it is possible for the driver to leave the vehicle without setting up the alarm permission mode, because it is then presumed that all the locks have been locked. Also, in the event that the door is closed without being locked for washing of the vehicle, for instance, no buzzing or alarming is effected because none of the door locks has been locked.

Also, after the driver gets into the vehicle to drive it, once the key 26 of the steering lock mechanism has been inserted into the key switch and turned to position "ON", the steering lock mechanism becomes unlocked, that is, the lock pin is retreated, whereby the lock pin switch 4 is turned on so that neither buzzing or alarming is effected and the alarm permission mode is not set up.

(3) Cancellation and establishment of the alarm permission mode by means of a key 26 with a proper code:

With the alarm permission mode established (step 117), if a key 26 with the proper code is inserted in a door cylinder lock 27, then the magnet 30 as a magnetic flux creating means, arranged at the periphery of the lock 27 (FIG. 3), creates a magnetic flux passing the key hole 27a. The Hall element 31 detects a change in the magnetic flux caused by the movement of the magnetic element 36 of the key 26, and the resulting output voltage from the Hall element 31 is amplified and outputted by the amplifier circuit 3 (step 118). If the output voltage lies within a predetermined voltage range (step 119), the alarm permission mode is cancelled (step 120), whereafter a command signal from the control circuit 2 is inputted to the actuator 24 to allow the door lock of the door lock mechanism to freely rotate.

Figure 10:
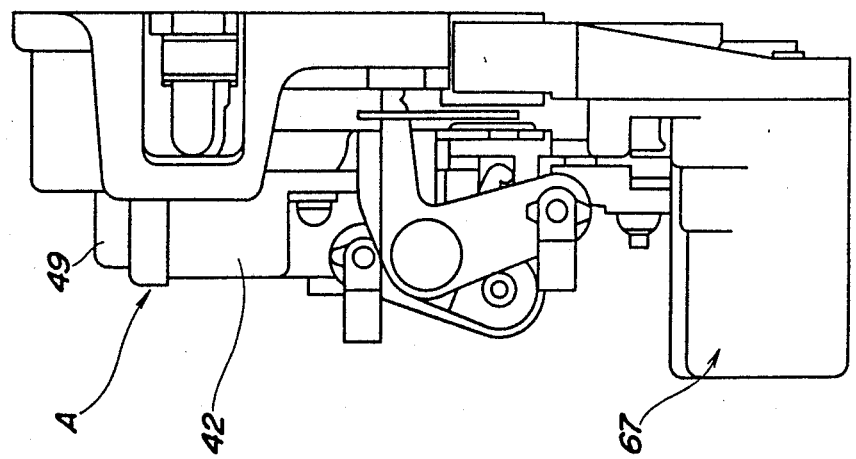
FIG. 10 is a side view of same.
Figure 9:
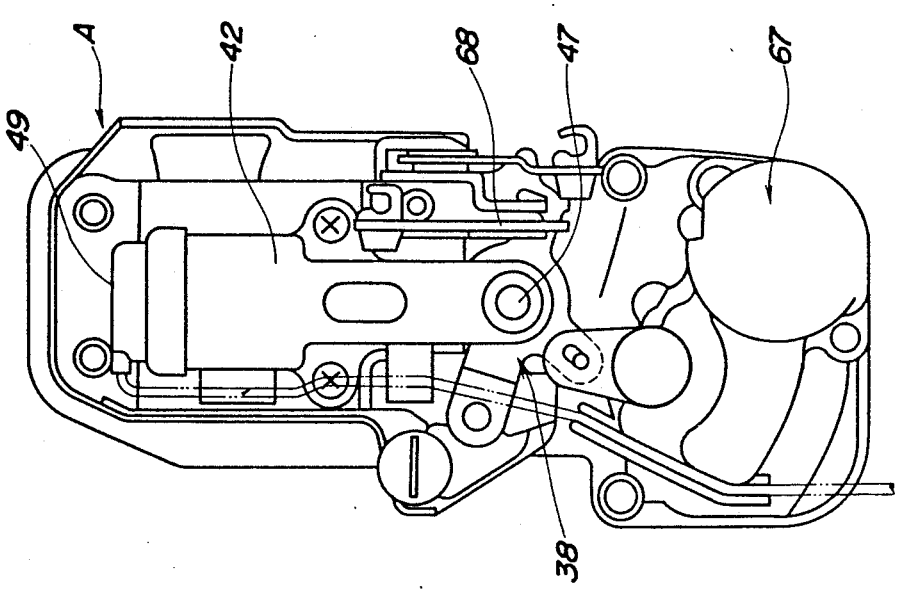
FIG. 9 is a front view of of a door lock free rotation mechanism of a door lock mechanism.

In response to this command signal, the look cam 42 of the door lock free rotation mechanism A of the door lock mechanism moves downward, as viewed in FIGS. 9 and 10 to be received into the cam inserting recesses 64, 65 of the first and the second levers 38, 39, whereby the first and second looking levers 38 and 39 are connected with each other to thus render the door lock mechanism unlockable (step 121).

(4) Alarming caused by improper or illegal operation:

With the alarm permission mode established (step 117), if [1] the bonnet is forced to open in some improper manner, the bonnet switch 6 is turned on (step 122), whereby a command signal is outputted from the control circuit 2 to effect alarming (step 123). This alarming may be effected by intermittently actuating the horn for five minutes for instance while flickering the headlights 21 and the winkers 22 for five minutes for instance. On this occasion, the starter cut relay 23 is kept energized until the alarm permission mode is cancelled, whereby the engine is prevented from starting.

[2] If the trunk is forced to open in some improper manner, the trunk lock switch 10 is not turned on while the trunk switch 9 is turned on (step 124), whereupon a command signal is generated by the control circuit 2 to effect the alarming.

[3] If a door lock cylinder is rotated with a key having a similar key profile to that of the proper key and the door is unlocked by means of the door lock knob, the output voltage of the key sensing device 3 falls outside a predetermined voltage range as shown in the afore-given table by way of example (step 125) and at the same time the driver-side lock knob switch 11 or the assistant-side lock knob switch 5 is turned on (step 126 or 127). Then a command signal from the control circuit 2 causes the alarming to be effected.

[4] If a door cylinder lock 27 is broken and the door is opened, the driver-side door switch 8 or the assistant-side door switch 7 is turned on (step 128) . Then a command signal from the control circuit 2 causes the alarming to be effected.

Suppose that a key with the same profile as that of the proper key is inserted into a door cylinder lock 27 to try to unlock a door. Since the the key body 35 does not contain the magnetic element 36 which causes the key sensing device 3 to generate an output voltage within the predetermined voltage range, no command signal from the control circuit 2 is inputted to the lever clutch actuator 24 of the automatic door lock mechanism though the door cylinder lock 27 can then be rotated. Thus the lock cam 42 assumes the upper position, as viewed in FIGS. 9 and 10 so that the first locking lever 38 and the second locking lever 39 remain disengaged from each other, wherefore operation of the outer handle of &he door or the inner handle of same cannot render the door to be unlocked.

Also, as a countermeasure against unlocking by means of a key other than the proper key while the alarm permission mode is established (step 117), it is arranged such that when the key sensing device 3 successively generates output voltage lying outside the predetermined voltage range two or more times, then the control circuit 2 causes the key sensing device 3 to remain inoperative for two minutes for instance to thereby make it difficult for the alarm permission mode to be cancelled (step 129).

When the battery 1 gets so exhausted that the power supply to the control circuit 2 is interrupted while the alarm permission mode is established, the door lock mechanism remains in freely rotatable condition so that unlocking of the door cannot be realized. In order to avoid this, there is provided a substitutive power source in the trunk, for example, which source is made to connect to the control circuit 2 when the power supply from the battery is interrupted, whereby continued energization of the control circuit 2 is ensured.

[5] Stoppage of alarming

Alarming can be stopped by inserting a key 26 with a proper magnetic element 36 into the key hole of an ignition switch of the engine. When the proper key 26 is inserted, the magnet 30 provided at the periphery of the key hole of the ignition switch creates a magnetic flux passing the key hole 27a, and a change in the magnetic flux caused by movement of the magnetic element 36 of the key 26 is detected by the Hall element 31. The resulting output voltage of the Hall element 31 is amplified and outputted by the amplifier circuit 32 (step 130). Then if this output voltage is within the predetermined voltage range (step 131), the alarming is interrupted (step 132).

It is arranged such that when the key sensing device 3 successively generates output voltage value lying outside the predetermined voltage range two or more times due to the use of an improper key, the key sensing device 3 is maintained inoperative for two minutes for instance whereby it becomes difficult for the alarm permission mode to be cancelled (steps 134 and 133).

The above described manner of control and operation of the switches are shown in Table 1.

FIGS. 17 through 21 show the anti-theft system for automotive vehicles according to a second embodiment of the invention. Incidentally, the automatic door lock mechanism (FIGS. 11, 12) as used in the first embodiment is applied in the second embodiment, too.

Figure 18:
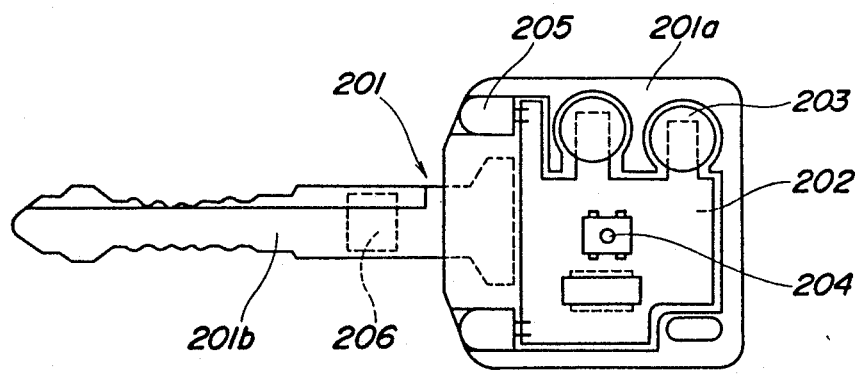
FIG. 18 is a side view of a key employed in the second embodiment wherein part of the key is omitted.

FIG. 18 shows an example of a key 201 employed in the second embodiment. A circuit board 202 is mounted within the head 210a of the key 201. A battery 203, a switch 204 operated by depressing a push button, not shown, infrared-ray LED's (light emitting diodes) 205, etc. are mounted on the circuit board 202. The head 201a is provided with a cover, not shown. Also, a magnetic element 206 is buried in the inserting portion 201b of the

TABLE 1

| MODE | OPERATION | LOCK PIN SW. UP: ON DOWN: OFF 4 | LOCK SW. LOCK: OFF UNLOCK: ON | | DOOR SW. CLOSED: OFF OPEN: ON | | TRUNK SW. CLOSED: OFF OPEN: ON NUMERAL 9 | BONNET SW. CLOSED: OFF OPEN: ON 6 | TRUNK LOCK SW. LOCK: OFF UNLOCK: ON 10 | INFORMING AND ALARMING EFFECTED |
|---|---|---|---|---|---|---|---|---|---|---|
| | | | DRIVER SIDE 11 | ASSIST SIDE 5 | DRIVER SIDE 8 | ASSIST SIDE 7 | | | | |
| PREVENTION OF FORGETTING TO SET UP ALARM MODE | DRIVER DOOR OR ASSIST. DOOR IS LOCKED AFTER REMOVAL OF KEY FROM KEY SW. | OFF | ON → OFF | OFF | ON → OFF | OFF | ON or OFF | ON or OFF | ON or OFF | (INFORMING EFFECTED 5 INTERMITTENT BUZZINGS) |
| ALARM MODE SET | 1 ASSIST. DOOR LOCKED BY LOCK KNOB, & DRIVER DOOR LOCKED BY KEYLESS LOCKING | OFF | ON → OFF | OFF | ON → OFF | OFF | OFF | OFF | OFF | EFFECTED A 3-SEC. LONG BUZZING DOOR LOCK SET FOR FREE ROTATION |
| | 2 DRIVER DOOR LOCKED BY LOCK KNOB, & ASSIST. DOOR LOCKED BY KEYLESS LOCKING | OFF | OFF | ON → OFF | OFF | ON → OFF | OFF | OFF | OFF | (INFORMING) |
| IMPROPER OPERATION | OFF | OFF | OFF | OFF | OFF | OFF | ON | OFF | OFF | INFORMING EFFECTED |
| | 1 BONNET FORCED TO OPEN | OFF | OFF | OFF | OFF | OFF | OFF | ON | OFF | HORN ACTUATED INTERMITTENTLY FOR 5 MIN. HEADLAMPS WINKED |
| | 2 TRUNK FORCED TO OPEN | OFF | OFF | ON | OFF | OFF | ON | OFF | OFF | |
| | 3 DOOR PANE BROKEN AND DOOR OPENED BY LOCK KNOB | OFF | ON | OFF | OFF | OFF | OFF | OFF | OFF | |
| | 4 DOOR CYLINDER LOCK BROKEN AND DOOR OPENED | OFF | OFF | OFF | ON | ON | OFF | OFF | OFF | | key 201 An electric circuit is provided on the circuit board 302 for transmitting a signal to a first key sensing portion 224 (FIG. 1) provided on the side of the vehicle. The first key sensing portion 224 is adapted to output a predetermined locking or unlocking signal when receiving an infrared ray carrying a predetermined first code from LED's 205.

Figure 19:
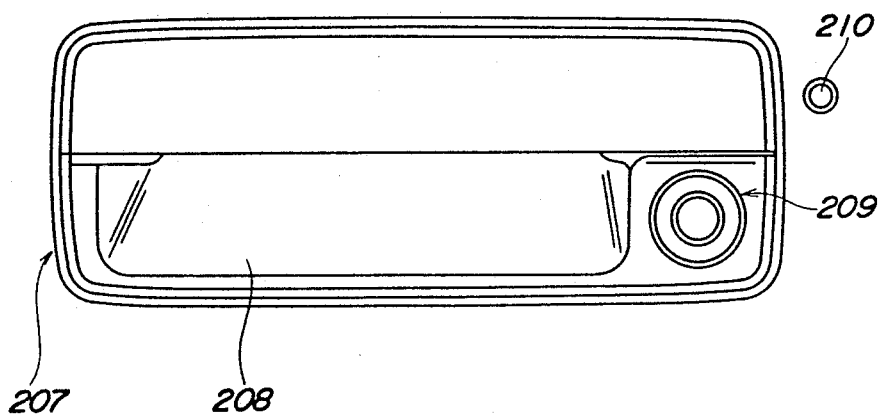
FIG. 19 is a view showing an outdoor handle of an automotive vehicle.
Figure 20:
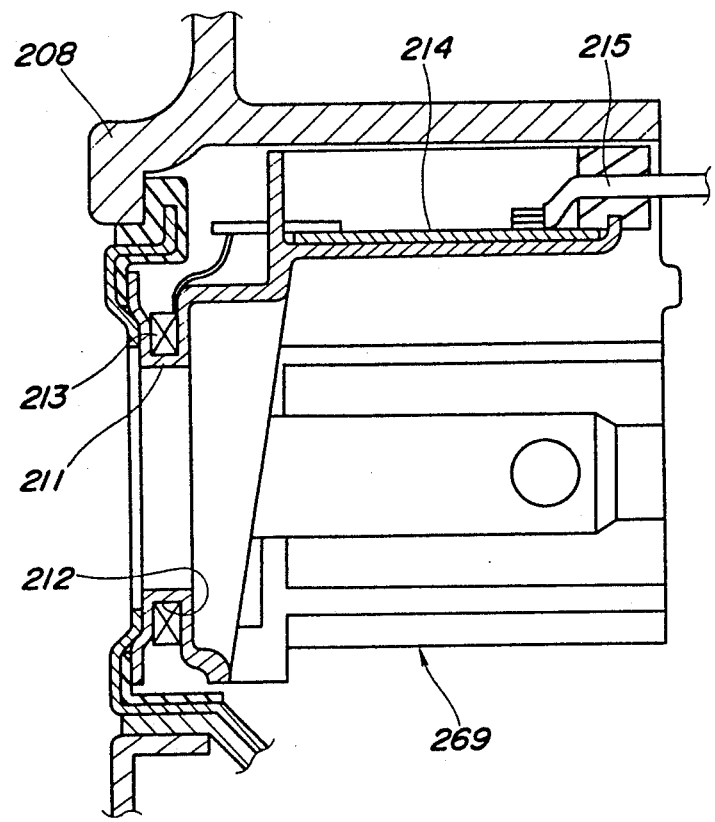
FIG. 20 is a cross-sectional view of a cylinder lock case.

FIG. 19 shows the locations of a door handle 207, an out handle case 208, a door cylinder lock 209 into which the key 201 is inserted, and a light sensing portion 210 of the first key sensing portion 224. As shown in FIG. 20, the door cylinder lock 209 is constructed such that an annular recess 212 is formed in the outer periphery of the open end of the cylinder case 211 defining the key hole. A sensing coil 213 is fitted in the annular recess 212, and is connected to an electric circuit of a magnetic element sensing portion (second key sensing portion 229 in FIG. 17), hereinafter described, provided on a circuit board 214 via a lead wire 215.

Figure 17A:
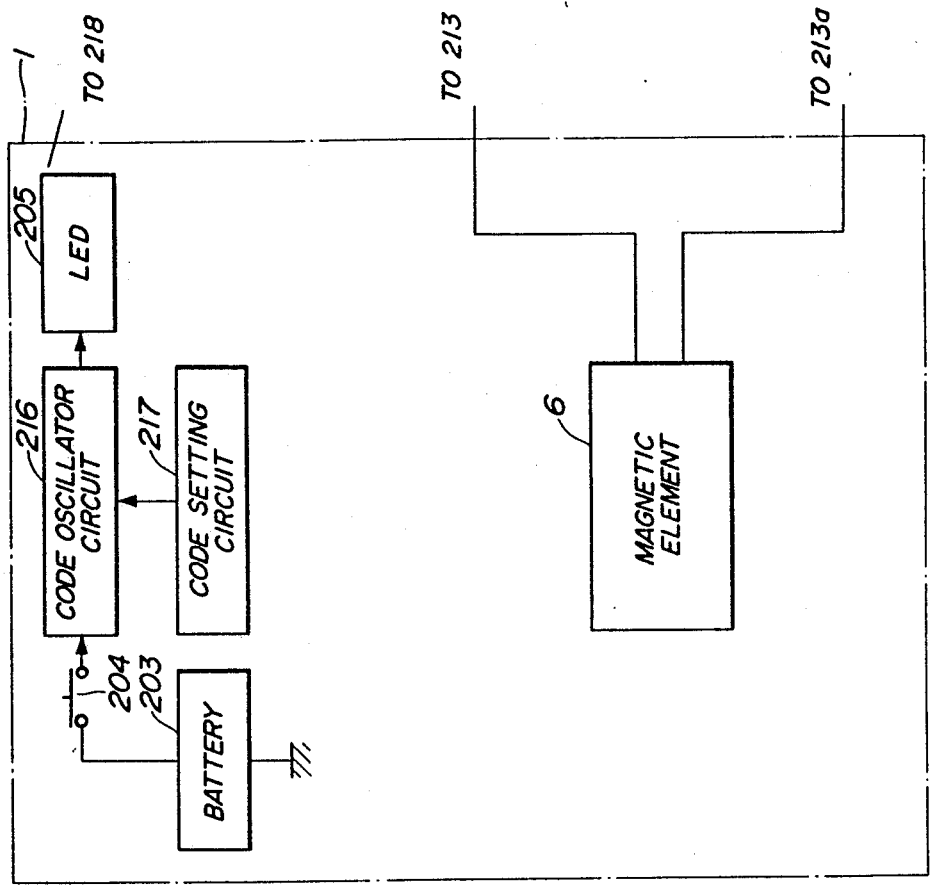
FIGS. 17–17B are a block diagram showing key sensing portions and an engine start disabling device of the anti-portions theft system for automotive vehicles according to a second embodiment of the invention.
Figure 17:
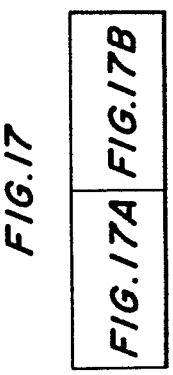

FIG. 17 shows the whole electrical arrangement of the system of the second embodiment. When the switch 204 is depressed to close, the output voltage of the battery 203 buried in the head 201a of the key 201 is supplied to a code oscillator circuit 216 mounted on the circuit board 202, whereby the code oscillator circuit 216 is actuated to output a signal representing the predetermined first code in response to which signal the infrared ray carrying the predetermined first code of the key 201 is emitted from the LED's 205. Incidentally, a code setting circuit 217 is provided for the code oscillator circuit 216 to enable the latter to transmit an infrared ray carrying a predetermined desired code.

The infrared ray emitted by the LED's 205 is sensed by the photo sensor 218, which converts the sensed infrared ray into an electric signal, which is then amplified by an amplifier circuit 219. Next, a code comparator circuit 320 compares the thus amplified electric signal with an output signal indicative of the set code from a code setting circuit 221 which provides a predetermined code stored, as the set code. If the two signals agree, that is, if the code of the key 210 agrees with the set code, a first signal output circuit 222 outputs a first code agreement signal.

In response to this first code agreement signal, the lever clutch actuator 24 of a driving device 260 is driven so as to interlock the first and second locking levers 38, 39 of the automatic door lock mechanism (ref. FIGS. 11 and 12) with each other. At the same time, the door lock actuator 67 (also of the driving device 260) for swinging the locking lever 38 via the lever 67a is also driven such that if a door lock device 230 is in the locking position, the actuator 67 is driven in the unlocking direction and if the former is in the unlocking position, the latter is driven in the locking direction, whereby the second locking lever is displaced by the actuator 67 so that an eccentric pin 39b provided on the second locking lever 39 is displaced to cause the door lock device 230 to be either locked or unlocked.

In the case where locking and unlocking is effected without the use of infrared ray transmission, when the magnetic element 206 provided in the key 201 and also carrying a second code is inserted into the sensing coil 213 provided in the door cylinder lock 209, a key sensing circuit 225 (e.g. formed of an LC oscillator circuit) generates and supplies a predetermined output to a magnetic element discriminating circuit 226 (comprising, for example, a circuit for counting oscillation output pulses from the key sensing circuit 225 and comparing the counted value with a predetermined reference set value). The magnetic element discriminating circuit 226 starts discriminating the code upon receipt of a command signal from a discrimination start command circuit 227 (e.g. formed of a microswitch disposed to be closed to indicate insertion of the key 201 when the tip of the key 201 touches a predetermined portion within the key hole). If the code is the proper one, the magnetic element discriminating circuit 226 supplies a predetermined output to a second signal output circuit 228, which in turn generates an output, in response to which the lever clutch actuator 24 in FIGS. 11, 12 is driven to thereby cause the first locking lever 38 to engage with the second locking lever 39. Then the second lever portion 66c of the first locking lever 38 facing the rotor is pulled by key operation to move the second locking lever 39 so that the door lock device 230 is rendered lockable via the eccentric pin 39b.

Figure 21:
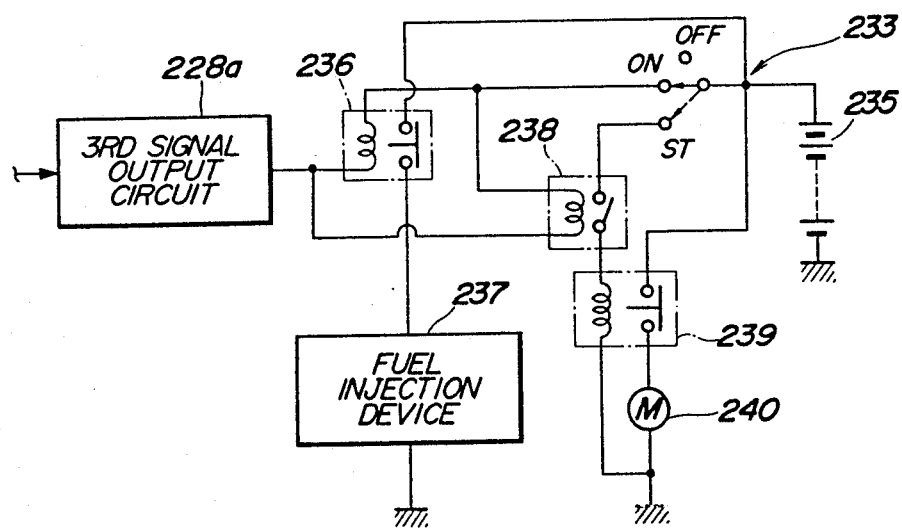
FIG. 21 is a circuit diagram of the engine start disabling circuit of FIG. 17.

On the other hand, the automotive vehicle is provided with a protection device 231, which comprises a third key sensing portion 232 of a similar construction to that of the second key sensing portion 229, an engine start disabling circuit 233, and an anti-theft alarm circuit 262. The third key sensing portion 232 is provided, for example, in the key inserting hole of an ignition switch of the steering lock mechanism, and comprises a sensing coil 213a, a key sensing circuit 225a, a magnetic element discriminating circuit 226a, a discrimination start command circuit 227a, and a third signal output circuit 228a. The engine start disabling circuit 233 is constructed as shown in FIG. 21, for example, which will be referred to hereinafter. The anti-theft alarm circuit 262 comprises, for example, a buzzer, a horn, head lamps, etc. The engine start disabling circuit 233 and anti-theft alarm circuit 262 are rendered operative in response to output signals from a keyless lock operation detecting circuit 263, and are rendered inoperative by at least one of the first, second and third signal output circuits 222, 228, 228a.

The keyless lock operation detecting circuit 263 generates a predetermined output signal when the assistant-side door and all the other doors but the driver-side door are locked by means of the lock knobs and at the same time the driver-side door is locked by so-called keyless locking, which is effected by depressing the lock knob with the door open and then shutting the door by pulling the door handle.

The engine start disabling circuit 233 functions as follows: When the key 201 is inserted into the key inserting hole and is turned from an ignition-off position (OFF) to an ignition-on position (ON), the battery 235 supplies power voltage to the magnetic element discriminating circuit 226a, etc. whereby the third signal output circuit 228a, etc. start operating. Then, in response to an output signal from the third signal output circuit 228a, an excitation coil of a main relay 236 is energized to close contacts thereof, whereby a fuel injection device 237 for the engine E is rendered operative, and at the same time an excitation coil of the start out relay 238 is energized to close contacts thereof. On this occasion, turning the key 201 from the ignition-on position (ON) to a starter position (ST) causes an electromagnetic switch 239 to be energized, whereby the starter motor 240 is driven.

When a signal indicative of keyless lock operation is inputted to the lever clutch actuator 24 from the keyless lock operation detecting circuit 263, the driving gear 53 of the door lock free rotation mechanism A is rotated to cause upward movement of the guide rack 54, which in turn causes the lock cam 60 to leave the cam inserting recesses 64, 65, whereby the interlocking of the first locking lever 38 with the second locking lever 39 is cancelled so that the door lock mechanism is maintained in operative state wherein the second locking lever 38 is not operated by the cylinder lock 27 nor by the lock knob.

The operation of the second embodiment constructed as above will now be described.

First, reference is made to remote control of the operation of driving means 260 and the protection device 231: When the switch 204 is closed by depressing the push button provided on the key 201, the LED's 205 emit an infrared ray carrying a first code set in the key 201. Then, the photo sensor 218 of the first key sensing portion 224 senses the emitted infrared ray whereupon a locking or unlocking command signal is outputted from the first signal output circuit 222 in response to the first code agreement signal outputted from the code comparator circuit 220. In response to the code agreement signal, the first signal output circuit 222 determines whether or not the door lock is locked, and the lever clutch actuator 24 and the door lock actuator 67 are operated such that if the determination result is affirmative, the door lock is unlocked, and if negative, it is locked. At the same time, the anti-theft alarming circuit 262 of the protection device 231 is rendered inoperative in response to the code agreement signal generated by the first signal output circuit 222.

When it becomes impossible to lock and unlock the door lock by remote control due to power exhaustion of the LED's 205, etc., the door lock is locked and unlocked by means of key operation in &he following manner: When the key 201 is inserted into the key hole of the cylinder lock 209, and if the second code of the magnetic element 206 of the key is proper, then the magnetic element discriminating circuit 226 senses a proper change in the magnetic flux of the sensing coil 213 and generates a second code agreement signal, whereupon the second signal output circuit 228 causes the lever clutch actuator 24 to be driven in response to the second code agreement signal therefrom, so that it becomes then possible to unlock the door lock 209 by rotating the cylinder lock 209 with the key 201.

On the other hand, even if one tries to forcibly unlock the cylinder lock 209 in some improper manner, the door lock cannot be unlocked unless the rotor of the cylinder lock 209 is rotated by means of a proper key i, because the door lock free rotation mechanism A is in freely rotatable state.

Furthermore, even if one can enter the passenger compartment after breaking the door lock, one cannot start the engine start disabling circuit 233, that is, one cannot cancel the operative condition of the protection device 231, unless one uses the proper key.

Alternatively of the above construction, the engine start disabling circuit 233 of the engine start control device 231 may be operated in direct response to the output from the first signal output circuit 222 of the first key sensing portion or the output from the second signal output circuit 228 of the second key sensing portion 222.

Incidentally, in the second embodiment, the second key sensing portion is arranged such that a change in the magnetic flux (e.g. inductance change) is detected by means of the magnetic element 206 and the sensing coil 221 provided in the key 201, it may alternatively be arranged such that a change in the magnetic flux is detected by means of a magnetism sensing element, such as a Hall element and a magnetic element, as in the first embodiment.

Figure 22:
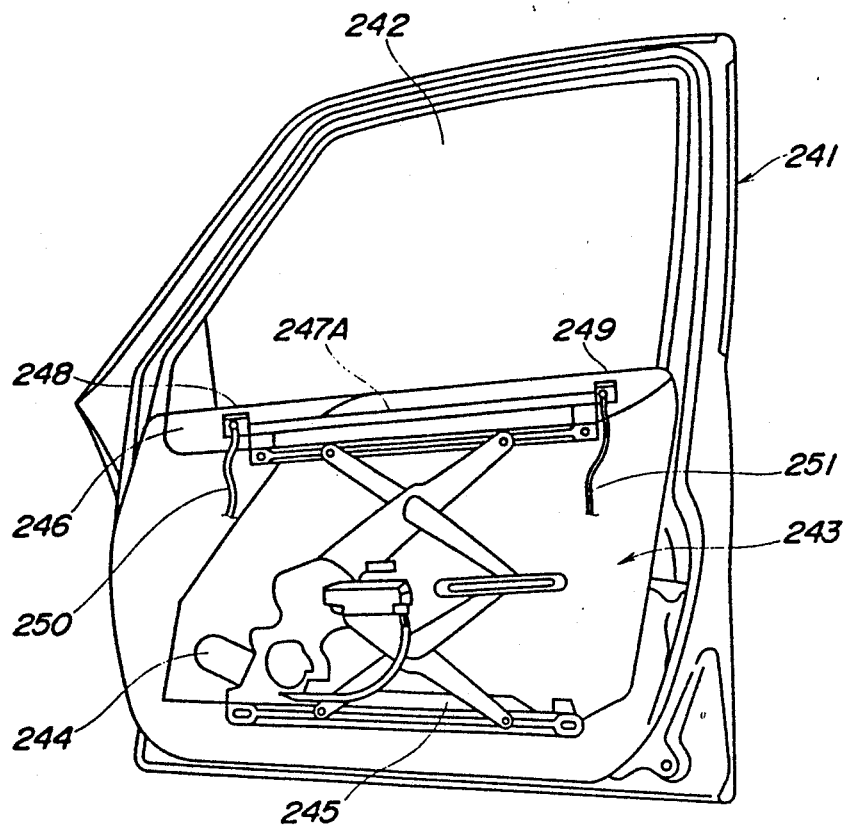
FIG. 22 is a view showing the internal construction of a door in which a door windowpane breakage detecting device is incorporated.
Figure 23:
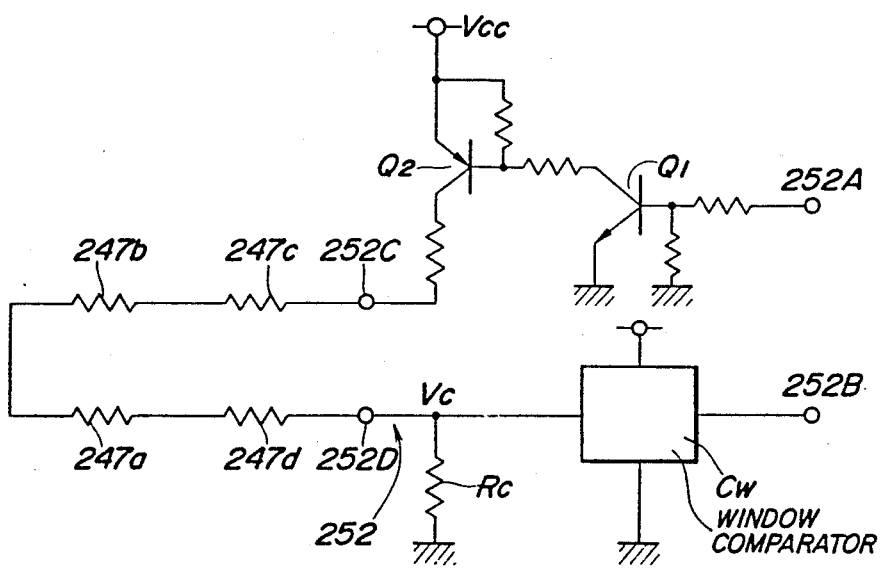
FIG. 23 is a circuit diagram of the door windowpane breakage detecting device of FIG. 22.

FIGS. 22 and 23 show a windowpane breakage detection device applicable to the second embodiment. For example, a windowpane 242 of the right-hand front door of the automotive vehicle is mounted in a main body 243 of the door such that it can slidably ascend and descend out of and into the door main body 243. Ascending and descending of the windowpane 242 is conducted by a lift mechanism 245. The windowpane 242 is made of roughened glass which has a characteristic of being pulverized when it locally receives a shock and is broken. In its descended position the windowpane 242 is entirely received in the door main body 243, and in its ascended position, that is, when the door window is fully closed, a lower end portion 246 of the windowpane 242 remains within the door main body 243 and therefore is not visible from the outside. An elongate strip of electric conductor 247A is stuck on an inner face of the lower end portion 246 of the windowpane 242 and horizontally extends. Terminals 248 and 249 at opposite ends of the electric conductor 247A are connected to a breakage detecting circuit 252 shown in FIG. 23, via respective lead wires 250 and 251. The electric conductor 247A is formed of a copper foil, for example, and constitutes a resistance 247a. The windowpanes of the left-hand front door, the left-hand rear door, and the right-hand rear door are each provided with a similar electric conductor, each electric conductor constituting a resistance 247b, 247c, 247d, respectively. The resistances 247a through 247d are connected in series between two terminals 252C, 252D of the breakage detecting circuit 252.

The breakage detecting circuit 252 has an input terminal 252A, to which a signal having a predetermined high level is normally applied by the power source, not shown, so that transistors Q1 and Q2 are normally energized. When the transistor Q1 is energized, a predetermined voltage Vc (e.g. about 50% of the supply voltage Vcc) is applied to one end of a detection resistance Rc, the other end of which is grounded. The voltage Vc is supplied to a window comparator Cw, which generates a predetermined low level signal. If the windowpane is normal, the output through the output terminal 252B via the window comparator Cw assumes the low level.

The window comparator Cw generates the low level output through the output terminal 252B when the voltage Vc is 20–80% of the supply voltage Vcc, and the window comparator Cw generates the high level output when the voltage Vc is higher than 80% of the supply voltage Vcc or lower than 20% of same. The high level output through the output terminal 252B is supplied to a buzzer or an indicator lamp, neither shown, whereby an alarm signal is obtained for actuation of the buzzer or turning-on of the indicator lamp.

Therefore, even when the windowpane is locally broken, its electric conductor, e.g. 247A, is cut, because, the windowpane formed of toughened glass is entirely pulverized. As a result, the voltage Vc of the breakage detecting circuit 252 becomes virtually 0 volt, whereby a high level output is obtained through the output terminal 262B.

Also, if, for some reason, the cut electric conductor 247A forms a short circuit with the power source, the voltage Vc becomes almost equal to the supply voltage Vcc, so that the output through the output terminal 252B becomes high in level whereby the alarm signal is obtained.

FIG. 24 shows the protection device 231 of the anti-theft system according to the second embodiment.

Connected to the protection device 231 are a key removal detecting circuit 253 for detecting whether the key 201 has been removed from the key inserting hole of the ignition switch, an open-closed state detecting circuit 254 for detecting whether or not all the coverings such as doors are closed, and a locking detection circuit 255 for detecting whether or not all the coverings are locked. Respective output signals from the key removal detecting circuit 253, the open-closed state detecting circuit 254, and the locking detection circuit 255 are inputted to the engine start disabling circuit 233 and an anti-theft alarm circuit 262. According to the second embodiment, the engine start disabling circuit 233 is controlled by means of the respective outputs from the first signal output circuit 222, the second signal output circuit 228, and the third signal output circuit 228a.

Next, the construction and operation of the protection device 231 shown in FIG. 24 will be described in detail.

The key removal detecting circuit 253 comprises a lock pin switch, which is adapted to turn on when, for example, the key 201 is inserted and turned in the key inserting hole of the steering lock mechanism, and turn off when the key 201 is removed from the key inserting hole.

The open-closed state detecting circuit 254 is adapted to supply the engine start disabling circuit 233 and the alarm circuit 262 with a signal indicative of the open stages or closed states of the various coverings (doors, trunk, bonnet, etc.).

The locking detection circuit 255 comprises a lock knob switch, which is adapted to turn off when, for example, the door lock is locked by operating the lock knob, and turn on when the door lock is unlocked.

Figure 25A:
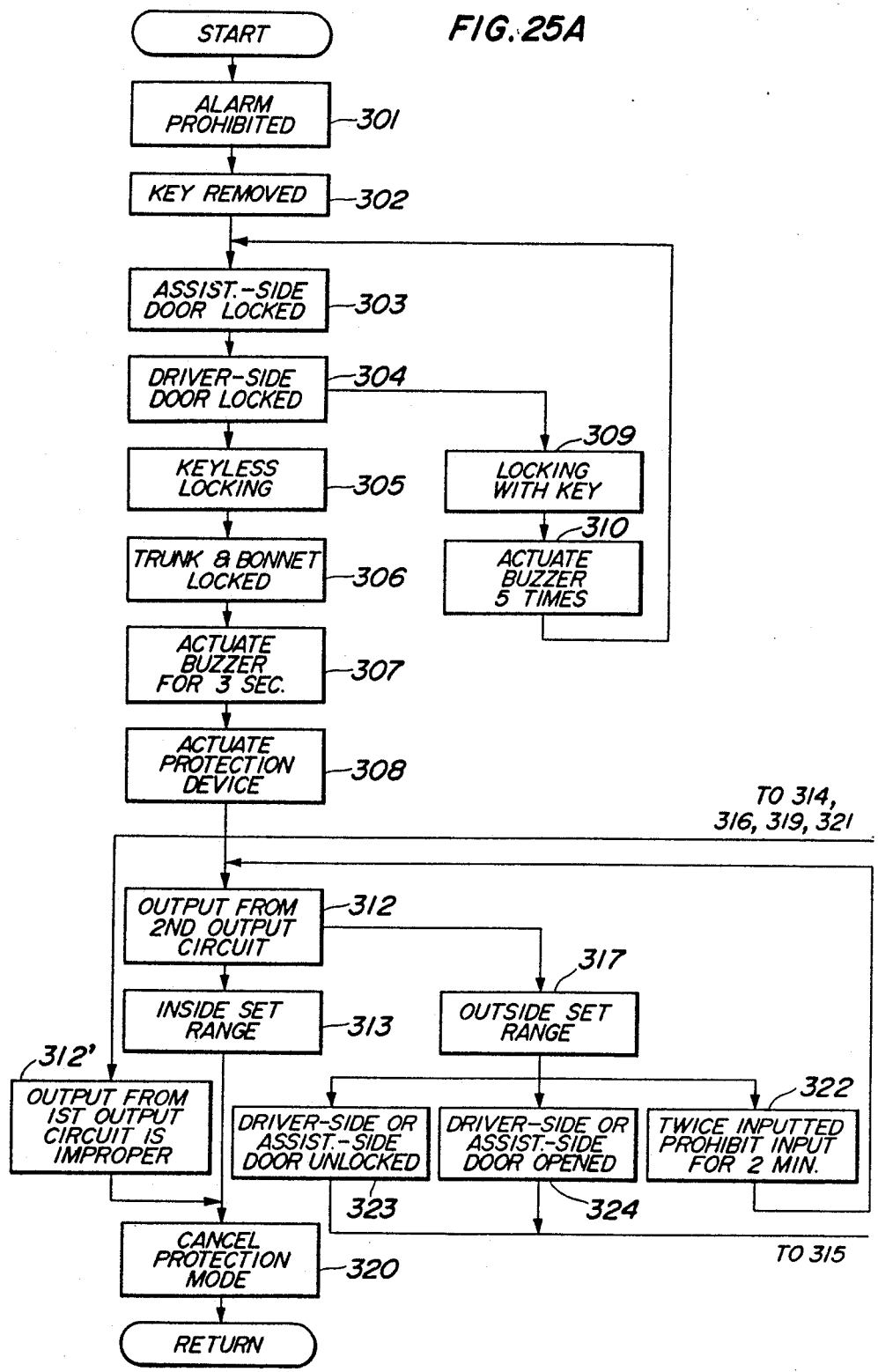
FIGS. 25–25B are a flowchart showing a manner of operating the anti-theft system according to the second embodiment.

The operation of the protection device 231 constructed as above will be described with reference to the flowchart of FIG. 25.

(1) Transition from protection prohibition mode of the protection device 231 to protection permission mode of same:

The protection permission mode is established only when the assistant-side door is locked by means of the lock knob, and then the driver-side door is locked by so-called keyless locking, which is effected by depressing the lock knob with the door open, and then shutting the door.

Supposing that the anti-theft system of the automotive vehicle is in protection prohibition mode (step 301) at the time of starting and then the key 201 is removed from the key inserting hole of the steering lock mechanism (step 302), then the lock pin stitch is turned off.

In order to establish the protection permission mode to render the anti-theft system operative, the following procedure is effected: The assistant-side door, for example, is locked by means of the lock knob (step 303), the driver-side door is locked in the keyless lock manner (steps 304, 305), and, if the other coverings, i.e. the trunk and the bonnet, are closed and also locked (step 306), then the buzzer as the operation informing means for the protection circuit 231 is actuated for a predetermined time period (e.g. 3 seconds) (step 307) to thereby inform that the protection permission mode has been established (step 308). Then, the protection device 231 is rendered operative.

Since the condition for establishment of the protection permission mode of the protection circuit 231 consists only of the keyless locking as noted above (steps 305), it is possible to prevent the driver from forgetting to set up the protection permission mode.

(2) Confirmation of the operation of the protection device 231:

If the key 201 is removed from the key hole of the key switch of the steering lock mechanism (step 302), and the driver-side door or the assistant-side door is locked with the key 201 (step 309), then it is detected that the door has been locked without keyless locking (i.e. without effecting (step 305), whereupon the buzzer repeatedly operates, e.g., five times (step 310) to thereby inform that setting of the protection permission mode has been neglected.

(3) Cancellation of the protection permission mode by means of a key 201 with proper code:

With the protection device 231 set in the operating state (step 308), if a door key 201 with a proper code is used, then the protection mode of the protection device 231 is cancelled (step 320) since the output from the first or second signal output circuit 222, 228 is the predetermined one representing the proper key code (steps 312, 313, 312'). As a result, the anti-theft alarm circuit 262 is prohibited from operating and thus alarming is not actuated. Then, if the driver enters the vehicle and inserts the proper key 201 into the key hole of the steering lock mechanism, the engine start disabling circuit 233 is rendered inoperative (step 316) as the second signal output circuit 228a outputs the predetermined output.

(4) Alarming caused by improper or illegal operation:

With the protection device 231 set in the operating state (step 308), if the bonnet (or the trunk) is forced to open in some improper manner (step 314), a bonnet switch (or a trunk switch) is turned on, whereby alarming is effected (step 315). This alarming may be in the form of intermittent actuation of the horn for five minutes, for instance, or flickering of the headlights and the winkers for five minutes, for instance (step 331). Thereafter, the protection device 231 is rendered inoperative (step 328).

After the protection device 231 has been set in the operating state, the starter cut relay 238 of the engine start disabling circuit 233 of the construction as described with reference to FIG. 21 is kept deenergized until the protection device 231 is rendered inoperative, whereby the engine is prevented from starting (step 316).

If a pane of a door is broken (step 319), or if the door is unlocked by the use of an improper key (step 323), the output voltage of the second signal output circuit 228a is then outside a predetermined voltage range (step 317), or the output from the first signal output circuit 222 does not indicate proper predetermined key code (step 312'), and at the same time the lock knob switch is turned on, whereby alarming of the step 315 is actuated.

When a pane of a door is broken, the breakage detecting circuit 252, described with reference to FIGS. 22 and 23, is operated to produce an output for giving the alarming (step 315).

Also when a door is opened after breakage of a door cylinder lock 209 (step 321), the alarming is also actuated (step 315).

Suppose that a key with the same profile as that of the proper key is inserted into a door cylinder lock 209 to try to cancel the operating state of the protection device 231. Since the predetermined output is not obtained from the third signal output circuit 228a (step 317), the protection device 231 is not rendered inoperative.

Also, as a countermeasure against unlocking by means of a key other than the proper key while the protection device 231 is in operating state (step 308), it is arranged such that when the second signal output circuit 228 successively generates a signal of a voltage lying outside the predetermined voltage range two or more times for instance, then the operation of the second key sensing portion 229 is suspended for 2 minutes, for example (step 322). so that the protection device 231 cannot be rendered inoperative easily.

(5) Stoppage of the operation of the protection device 231:

Stoppage of the operation of the anti-theft alarming circuit 262 of the protection device 231 and cancellation of the inoperative condition of the engine start disabling circuit 233 can be effected by inserting a key 201 with the proper magnetic element 206 into the key inserting hole of the steering lock mechanism. When the proper key 201 is inserted, the sensing coil 213a provided at the key inserting hole detects a proper change in the magnetic flux, whereby the third signal output circuit 228a generates the predetermined output (steps 325, 326), which causes interruption of outputting from the alarming means (step 327) and cancellation of the operating condition of the protection device 231 (step 328).

When an improper key is used so that a signal having a voltage lying outside the predetermined range is successively outputted, e.g. twice, by the third signal output circuit 228a (steps 329, 330), the third key sensing portion 232 is rendered inoperative for a predetermined period of time, e.g. 2 minutes (step 330), and as a result it becomes impossible to render the protection device 231 inoperative.

As a countermeasure against shortage of power supply to the locking and unlocking system 230 and the protection device 231, the protection system of the invention includes an auxiliary power supply which is adapted to automatically supply power to the system 230 and the device 231 in the event of exhaustion of the main power source.

What is claimed is:

1. Apparatus for detecting forceful entry into an automotive vehicle by breakage of at least one windowpane of said automotive vehicle, comprising:
    said at least one windowpane being formed of toughened glass which is pulverized when broken;
    at least one electrically conductive strip provided coupled to said at least one windowpane at a location along substantially the entire length of a side thereof where it is invisible from outside of said automotive vehicle and adapted to be cut or broken when a corresponding one of said at least one windowpane pulverizes upon being broken; and
    detecting means coupled to said at least one electrically conductive strip for electrically detecting cutting or breaking of said at least one electrically conductive strip.

2. The apparatus of claim 1, wherein said detecting means comprises:
    cutting detecting circuit means for generating different output voltages when any of said at least one electrically conductive strip is cut or broken and when none of said at least one electrically conductive strip is cut or broken; and
    alarming signal output circuit means responsive to one of said different output voltages from said cutting detecting circuit means which is indicative of cutting or breaking of any of said at least one electrically conductive strip for generating an alarming signal.

3. The apparatus of claim 2, wherein said cutting detecting circuit means generates an output voltage falling outside a predetermined reference range when any of said at least one electrically conductive strip is cut or broken.

4. The apparatus of claim 1, wherein said at least one electrically conductive strip is adhered to a surface of a respective windowpane.

5. The apparatus of claim 1, wherein said at least one electrically conductive strip comprises a metal foil having a given electrical resistance.

6. The apparatus of claim 1, wherein said automotive vehicle has a plurality of windows each having said windowpane, and lift means arranged therein,
    said at least one electrically conductive strip being disposed along a lower side of said at least one windowpane,
    said at least one windowpane being vertically movable for closing and opening by said lift means.

7. The apparatus of claim 6, wherein said at least one electrically conductive strip has lead wires connected to both ends thereof,
    said lead wires extending at opposite sides of said lift means in spaced relation thereto.

8. The apparatus of claim 1, wherein said at least one windowpane comprises a plurality of windowpanes, and said at least one electrically conductive strip comprises a plurality of electrically conductive strips, said strips being disposed respectively on said windowpanes,
    said electrically conductive strips being connected in series.

9. The apparatus of claim 1, wherein the whole of said at least one windowpane is pulverized even when said windowpane receives a localized shock on one part thereof.

* * * * *

UNITED STATES PATENT AND TRADEMARK OFFICE
CERTIFICATE OF CORRECTION

PATENT NO. : 4,901,053

DATED : February 13, 1990

INVENTOR(S) : FUKAMACHI et al

It is certified that error appears in the above-identified patent and that said Letters Patent is hereby corrected as shown below:

Title page, under "References Cited", the U.S. Patent "3,969,373" should correctly be --3,696,373--.

Signed and Sealed this

Twenty-eighth Day of April, 1992

Attest:

HARRY F. MANBECK, JR.

*Attesting Officer*    *Commissioner of Patents and Trademarks*